(12) United States Patent
Walker et al.

(10) Patent No.: US 7,429,080 B2
(45) Date of Patent: Sep. 30, 2008

(54) SEAT WITH ADJUSTABLE SUPPORT SYSTEM

(76) Inventors: Brock M. Walker, 4095 Hulett Rd., Okemos, MI (US) 48864; James A. O'Brien, 6332 Ave. F., LaSalle, MI (US) 48145

( * ) Notice: Subject to any disclaimer, the term of this patent is extended or adjusted under 35 U.S.C. 154(b) by 0 days.

(21) Appl. No.: 11/240,617

(22) Filed: Oct. 3, 2005

(65) Prior Publication Data

US 2006/0103204 A1     May 18, 2006

Related U.S. Application Data

(63) Continuation of application No. PCT/US2004/010506, filed on Apr. 5, 2004.

(60) Provisional application No. 60/460,811, filed on Apr. 3, 2003, provisional application No. 60/467,356, filed on May 1, 2003, provisional application No. 60/472,649, filed on May 21, 2003, provisional application No. 60/490,319, filed on Jul. 25, 2003, provisional application No. 60/514,535, filed on Oct. 21, 2003.

(51) Int. Cl.
    *A47C 7/46* (2006.01)
(52) U.S. Cl. .................................. 297/284.4
(58) Field of Classification Search .............. 297/284.4, 297/284.7
    See application file for complete search history.

(56) References Cited

U.S. PATENT DOCUMENTS

| | | | |
|---|---|---|---|
| 3,288,525 | A | 11/1966 | Cerf |
| 3,807,794 | A | 4/1974 | Beyer |
| 4,182,533 | A | 1/1980 | Arndt et al. |
| 4,295,681 | A | 10/1981 | Gregory |
| 4,313,637 | A | 2/1982 | Barley |
| 4,437,702 | A | 3/1984 | Agosta |
| 4,564,235 | A | 1/1986 | Hatsutta et al. |
| 5,335,965 | A | 8/1994 | Sessini |
| 5,397,164 | A | 3/1995 | Schuster et al. |
| 5,505,520 | A | 4/1996 | Frusti et al. |

(Continued)

FOREIGN PATENT DOCUMENTS

DE          93 17 020          1/1994

(Continued)

OTHER PUBLICATIONS

European Search Report issued in corresponding European patent application No. 04758902.3, mailed Nov. 7, 2006 [7 pages].

(Continued)

*Primary Examiner*—Rodney B. White
(74) *Attorney, Agent, or Firm*—Alejandro J. Fernandez; Broad and Cassel

(57) ABSTRACT

A sacral support assembly for use with a seat is provided. The seat includes a seat frame. An adjustable sacral support assembly is connected to the seat frame. The sacral support assembly includes a sacral support member adapted to support the sacrum of a seated user. A method is also provided for delivering adjustable, stabilizing support to a user's sacrum and sacral-pelvic anatomy to reduce fatigue, increase comfort, stability and posture for a user, and a system for adjusting and controlling the load distribution from the sacral anatomy to the anatomical structures adjacent to a user's sacrum, for example, the pelvis and lumbar regions.

43 Claims, 22 Drawing Sheets

U.S. PATENT DOCUMENTS

| | | | |
|---|---|---|---|
| 5,518,294 A | 5/1996 | Lignon, Sr. et al. | |
| 5,567,010 A | 10/1996 | Sparks | |
| 5,567,011 A | 10/1996 | Sessini | |
| 5,577,811 A * | 11/1996 | Ogg | 297/284.4 X |
| 5,588,703 A | 12/1996 | Itou | |
| 5,704,687 A | 1/1998 | Klingler | |
| 5,718,476 A | 2/1998 | De Pascal et al. | |
| 5,762,397 A | 6/1998 | Venuto et al. | |
| 5,823,620 A | 10/1998 | Le Caz | |
| 5,833,319 A | 11/1998 | Davis | |
| 5,868,466 A | 2/1999 | Massara et al. | |
| 6,033,025 A * | 3/2000 | Christofferson et al. | 297/284.4 X |
| 6,059,370 A * | 5/2000 | Kanyer et al. | 297/284.4 X |
| 6,092,871 A | 7/2000 | Beaulieu | |
| 6,125,851 A | 10/2000 | Walker et al. | |
| 6,129,419 A | 10/2000 | Neale | |
| 6,206,463 B1 * | 3/2001 | Whigham | 297/284.5 X |
| 6,257,664 B1 | 7/2001 | Chew et al. | |
| 6,334,651 B1 | 1/2002 | Duan et al. | |
| 6,532,962 B1 | 3/2003 | Walker et al. | |
| 6,619,739 B2 | 9/2003 | McMillen | |
| 6,652,029 B2 | 11/2003 | McMillen | |
| 6,695,402 B2 | 2/2004 | Sloan, Jr. | |
| 6,824,214 B2 | 11/2004 | McMillen | |
| 6,969,114 B2 * | 11/2005 | Keilhauer | 297/230.1 |
| 2002/0109383 A1 | 8/2002 | Klingler | |
| 2002/0175553 A1 * | 11/2002 | Steifensand | 297/452.22 |
| 2003/0197407 A1 * | 10/2003 | Sanchez | 297/284.4 X |
| 2004/0075320 A1 | 4/2004 | Klingler | |
| 2005/0104428 A1 * | 5/2005 | Walker et al. | 297/284.4 |
| 2006/0001304 A1 * | 1/2006 | Walker et al. | 297/284.8 |

FOREIGN PATENT DOCUMENTS

| | | | |
|---|---|---|---|
| DE | 229 22 030 | 7/2000 | |
| DE | 10114521 | 9/2002 | |
| EP | 0423079 | 4/1991 | |
| EP | 423079 A1 * | 4/1991 | 297/284.4 |
| EP | 0700653 | 3/1996 | |
| JP | 03029610 | 2/1991 | |
| JP | 08191734 | 7/1996 | |
| JP | 2002360375 | 12/2002 | |
| WO | WO92/14387 | 9/1992 | |
| WO | WO 02/28339 | 4/2002 | |
| WO | WO 2004/089693 | 10/2004 | |

OTHER PUBLICATIONS

International Search Report in related International Application No. PCT/US2001/030448 mailed Apr. 5, 2002 [3 pages].

European Action issued in corresponding European patent application no. 04758902.3 mailed May 14, 2007.

European Search Report issued Jul. 25, 2007 in European patent application no. 05013983.1.

Search Report and Written Opinion mailed Jul. 27, 2007 in international appln. no. PCT/US2006/041878.

* cited by examiner

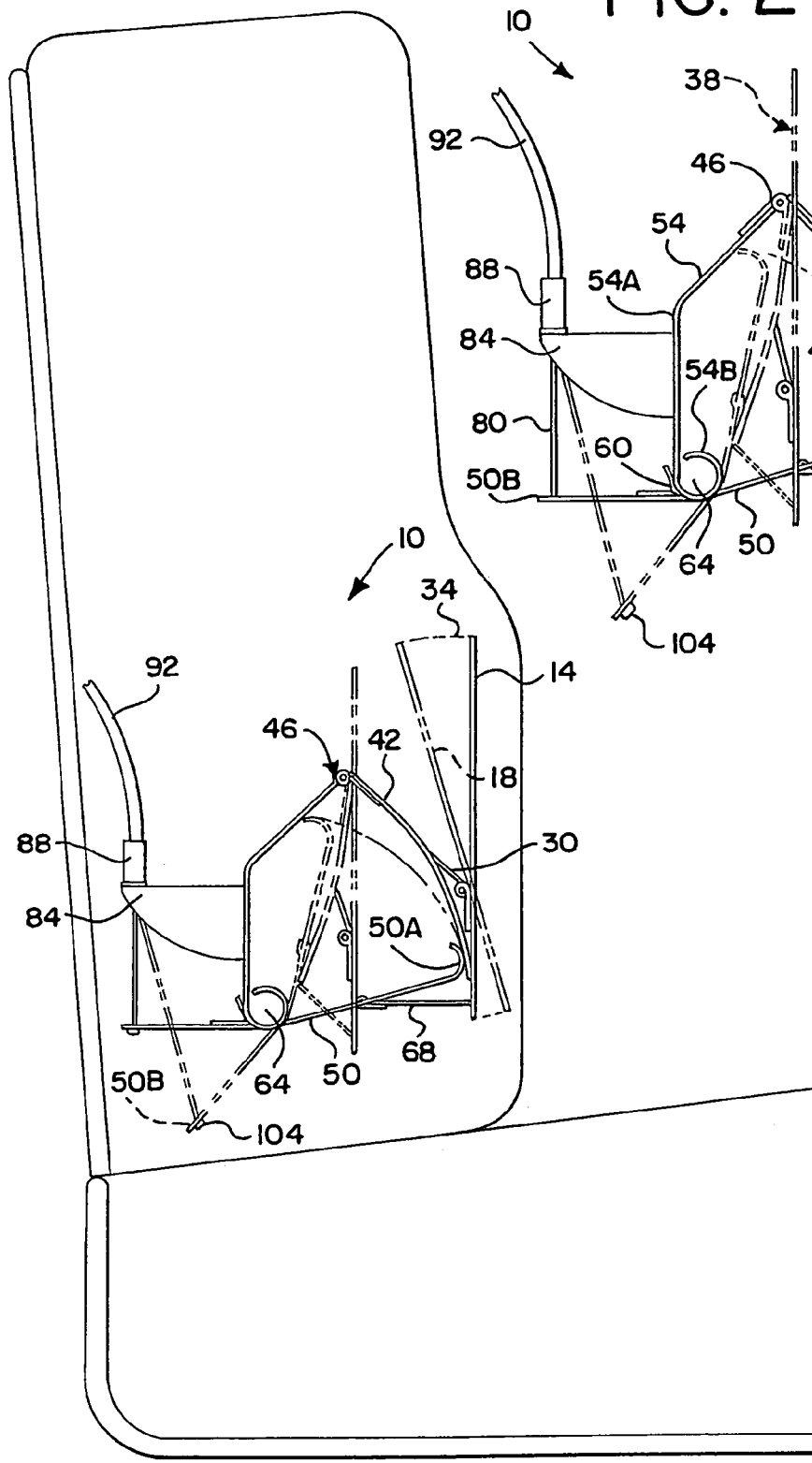

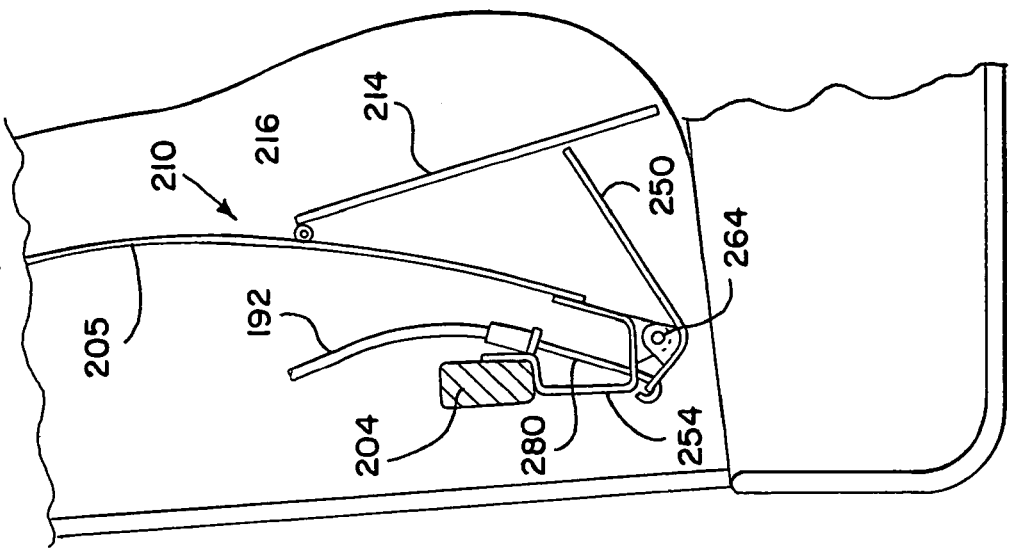
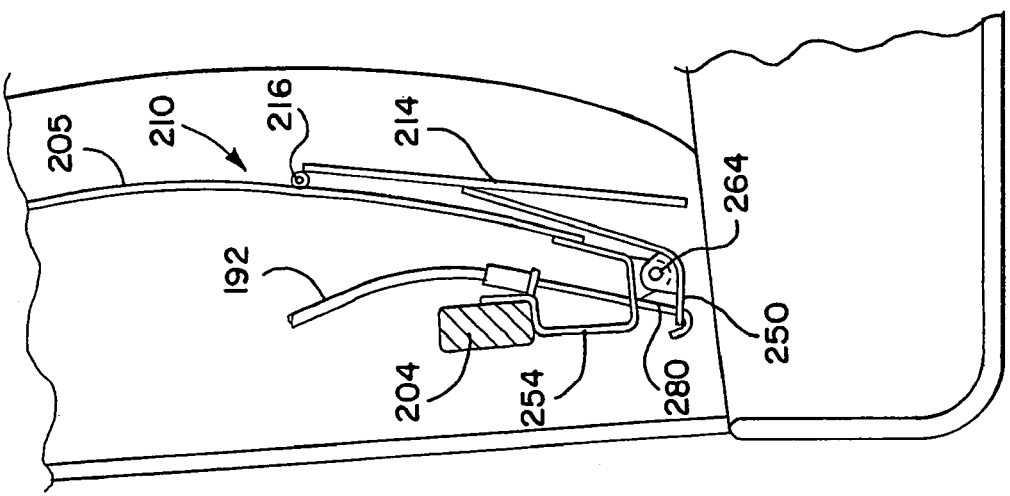
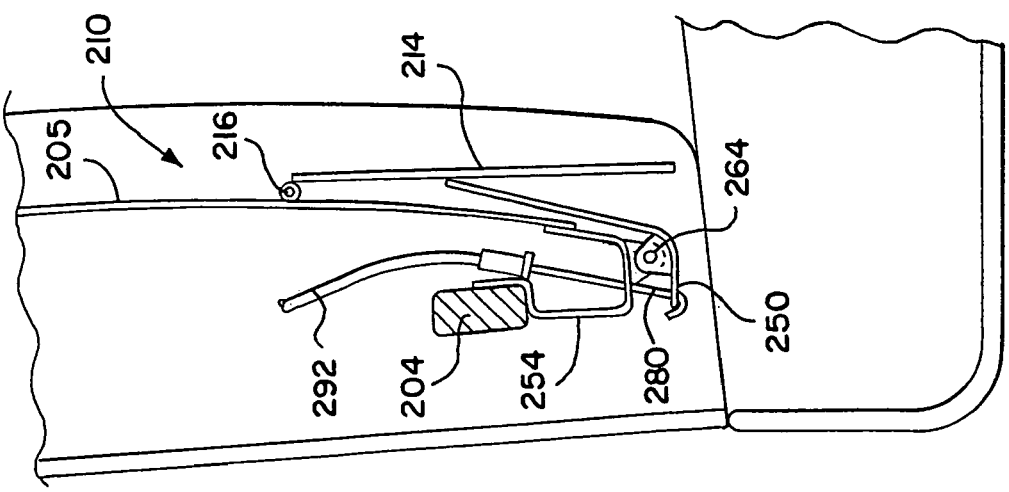

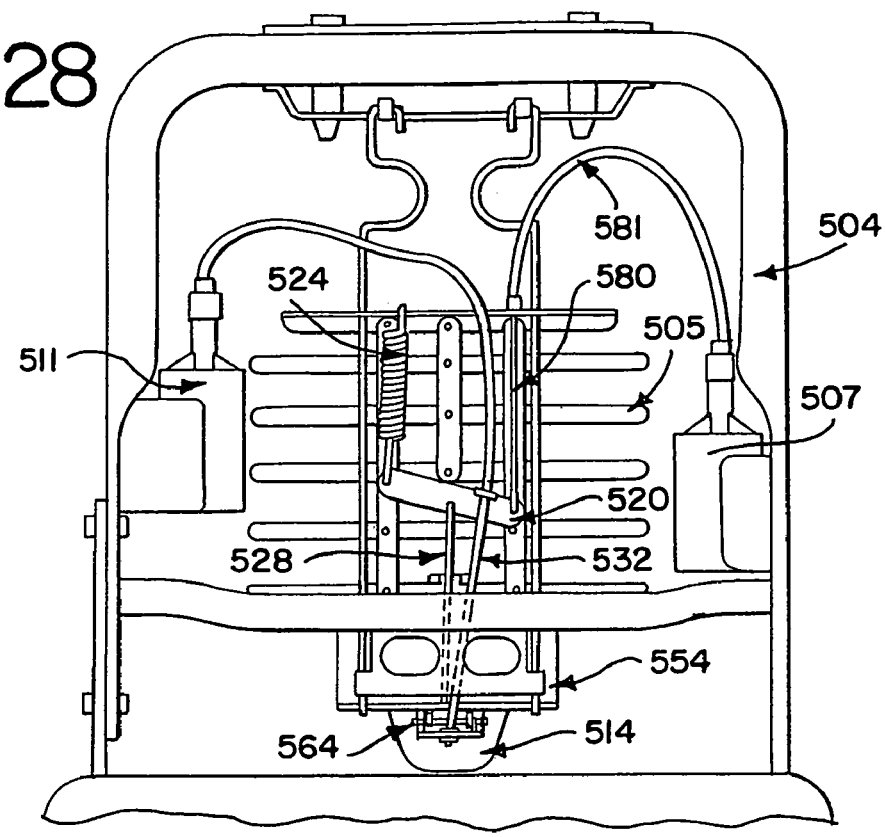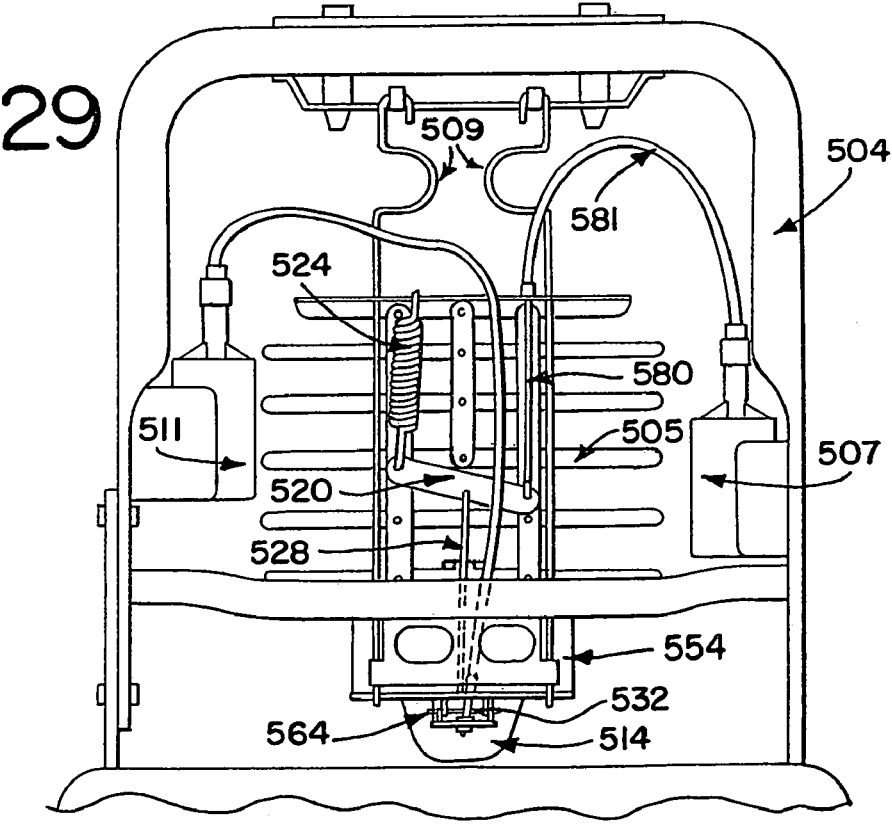

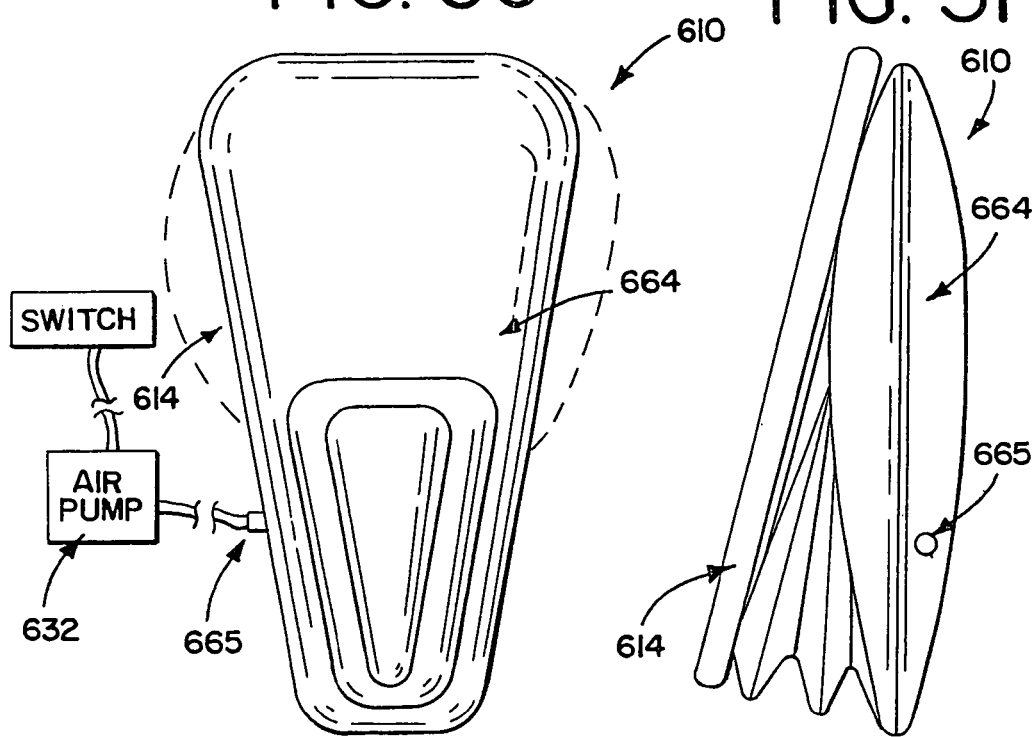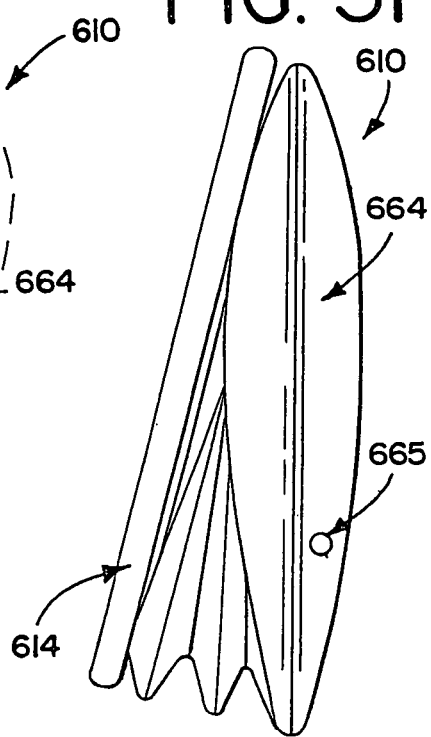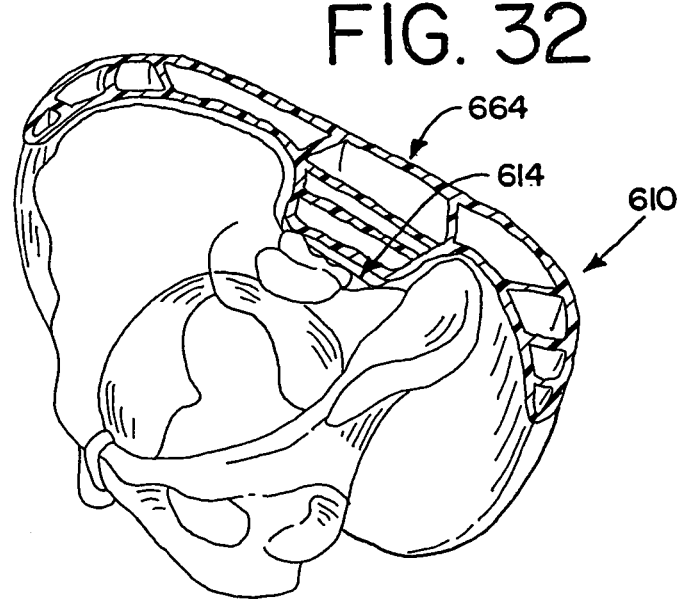

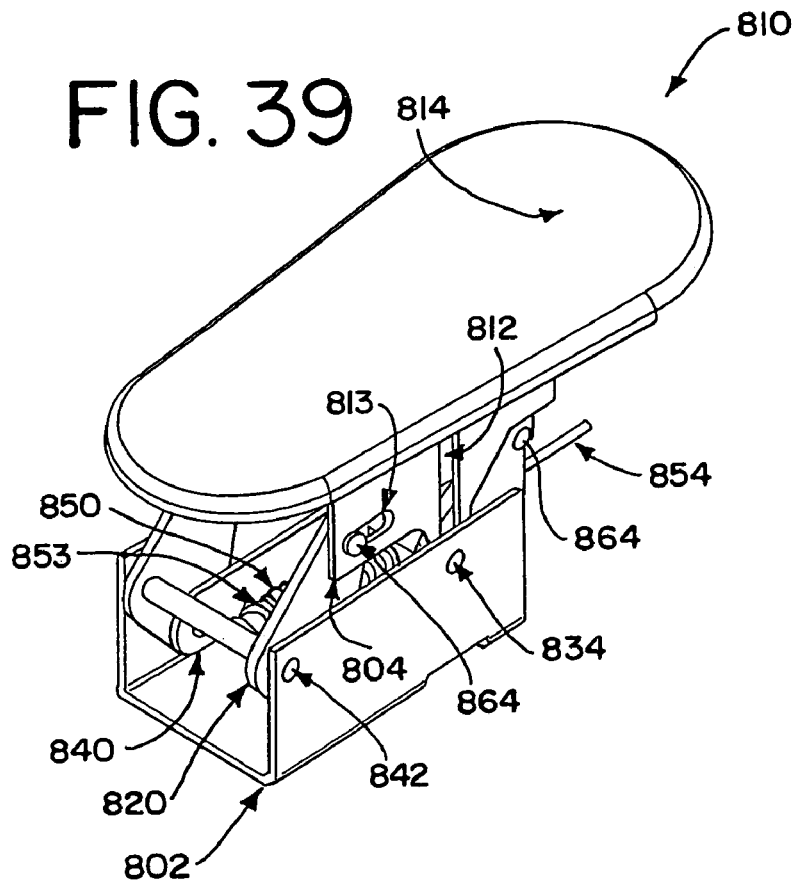
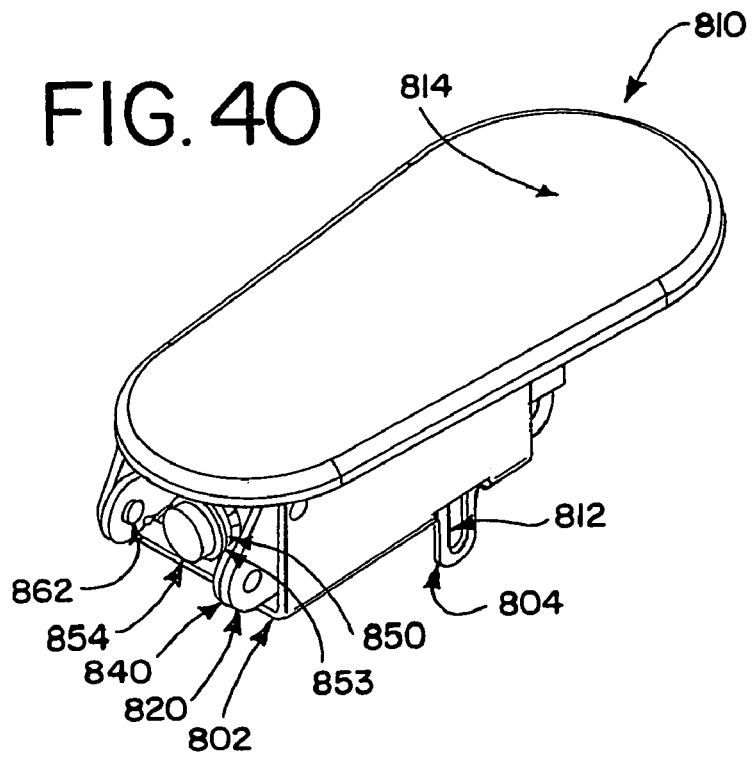

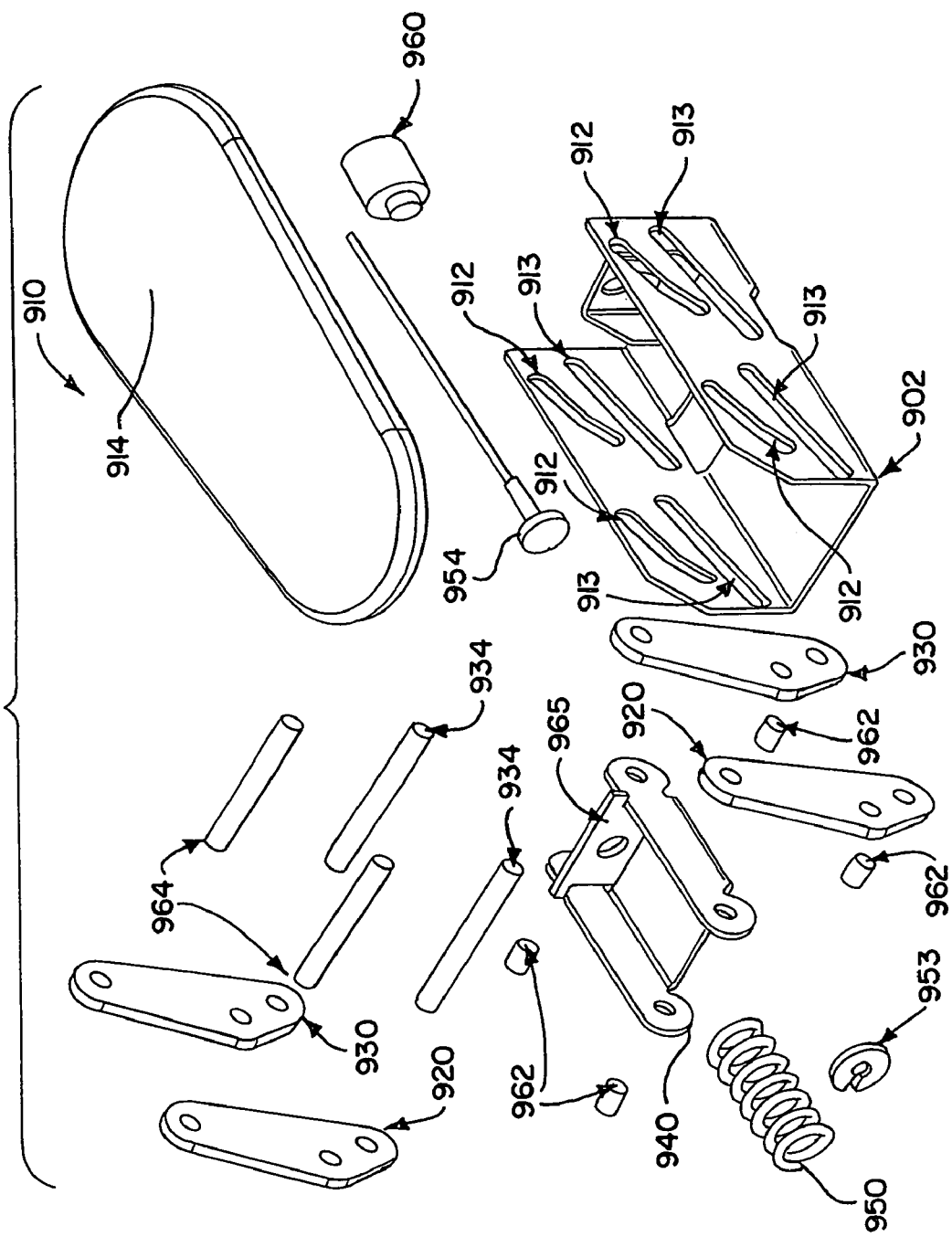

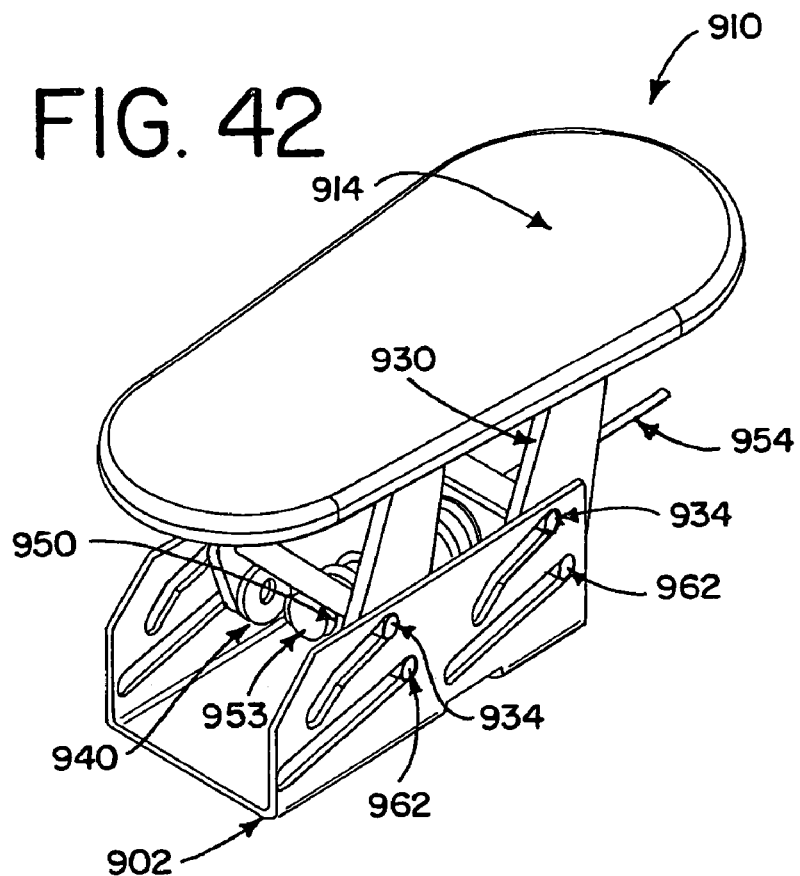
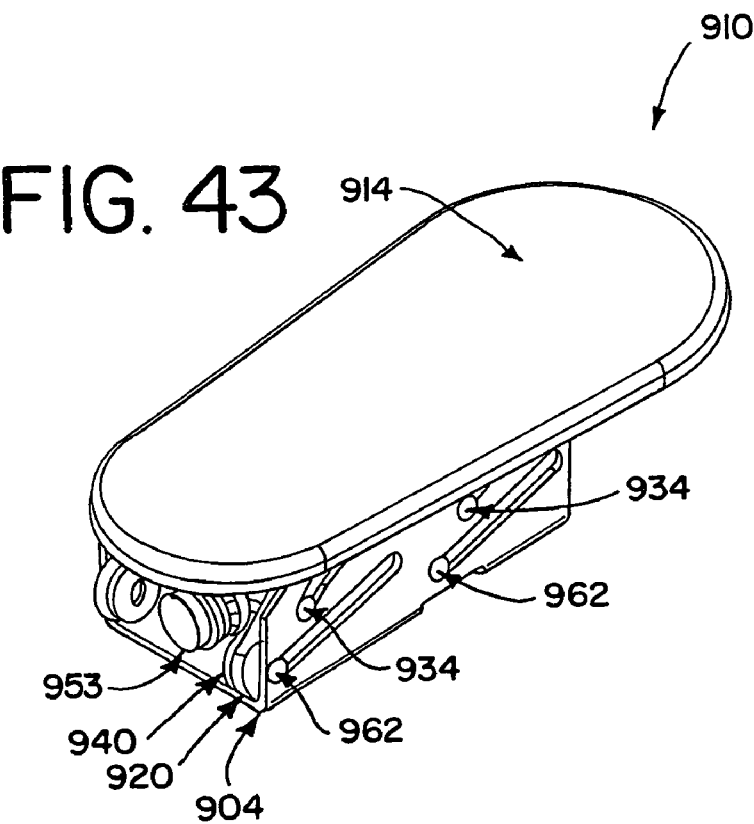

SEAT WITH ADJUSTABLE SUPPORT SYSTEM

RELATED APPLICATIONS

This application is a continuation of International Application No. PCT/US2004/010506, filed Apr. 5, 2004, which claims the benefit of U.S. Provisional Application Ser. Nos. 60/460,811, filed Apr. 3, 2003, 60/467,356, filed May. 1, 2003, 60/472,649, filed May. 21, 2003, 60/490,319, filed Jul. 25, 2003, and 60/514,535, filed Oct. 21, 2003 all of which are entitled "Vehicle Seat With Adjustable Support System." International Application No. PCT/US2004/010506, filed Apr. 5, 2004, was published in English under PCT Article 21(2) and is herein incorporated by reference.

FIELD OF THE INVENTION

The present invention relates generally to a seat with an adjustable sacral support member. In particular, this invention relates to a seat and method for delivering adjustable, stabilizing support to a user's sacrum and sacral-pelvic anatomy to reduce fatigue, increase comfort, stability and posture for a user, and a system for adjusting and controlling the load distribution from the sacral anatomy to the anatomical structures adjacent to a user's sacrum, for example, the pelvis and lumbar regions. This invention also relates to a method of creating proper anatomical balance, structural compensation, and posture control. This invention further relates to a method and process of managing and controlling human performance in various postural positions in all forms of seating.

BACKGROUND

Many people in modem society typically spend extended amounts of time seated at work, school, home, and/or while traveling. In particular, many have jobs that involve continuous sitting in an office environment for many hours. In addition, many people spend large amounts of time in vehicles, frequently traveling many miles in one trip, for example, while commuting to and from work. Furthermore, many people operate vehicles professionally, and accordingly are subjected to even greater amounts of time seated in a vehicle.

Generally, seats have several elements in common. They have a bottom portion, or seat pan, which receives the bulk of a user's weight, and a back portion, against which a user reclines. In addition, to accommodate users of varying proportions and sizes, many seats with a mechanism for adjusting the seat pan and back portion independently or simultaneously. Automobile seals often have such mechanisms, for example.

However, seats generally have insufficient back support, particularly as relates to the lowermost regions of the spine. The spine has four general regions: cervical (neck), thoracic (upper back), lumbar (lower back) and sacral (tail bone). More specifically, the sacrum forms the base of the spine. It is a large triangular fusion of five vertebrae wedged between the pelvic bones. The pelvic bones include the left and right ilium. The ilia each have a posterior border portion known as the posterior superior iliac spine ("PSIS"). The lack of support for the sacrum and a proper nesting configuration for the PSIS often leads to poor posture, and accordingly, varying degrees of discomfort and problems in a user's back or spine regions. Notably, back problems are more likely to occur at the junction of the lumbar spine and the sacrum when a user does not sit up straight.

Sitting up straight can be difficult for the users of seats. In particular, in many seats form a void between the back portion of the seat and the user's sacrum. This void may cause a user to take a slouched position. Slouching, in turn, may lead to a number of immediate problems, for example, increased fatigue, increased pressure on the lumbar discs, or the creation of muscle spasms. Moreover, various long-term problems may also occur as a result of slouching. These problems include pain in the lower back muscles, discomfort between the shoulder blades, tightening of neck muscles and muscle soreness and headaches.

To avoid problems associated with slouching while seated, previous attempts have been made to provide better back support. However, these attempts have failed to provide an adjustable, specific sacral support and contoured fit that will properly position the sacrum, the pelvis, and the supporting neural, muscular, and skeletal systems to provide total pelvic stability. In the past, the void that existed between the sacrum and the back of a seat failed to provide the preferred support for the sacrum and adjoining tissue and was almost entirely ignored by seat manufacturers. Moreover, previous seat manufacturers also ignored the importance of supporting the sacrum while avoiding excessive pressure build-up in the area of the PSIS.

Somewhat recently, it has been recognized that a spinal support device for applying a directed and concentrated force on the sacrum to properly position the pelvis and spine of a user could be constructed. In U.S. Pat. No. 6,125,851 ("the '851 patent"), a spinal support device is disclosed that helps support the sacrum of a user to induce the spine to take the preferable shape found in a normal standing posture. While the '851 patent addresses the void created by seats around the sacral region, there still exists an urgent need to implement proper sacral support integral to seatbacks, such as residential seatbacks, work chairs, commercial seatbacks, and/or vehicular seatbacks. In particular, there exists a need to provide proper sacral support in a system that is integral to a seat and adjusts according to the preferences of a variety of users that differ from each other in proportion and size. In addition, there exists a need to provide proper load distribution across the surrounding pelvic area, and especially as concerns the PSIS. There also exists a need to provide proper sacral support combined with proper lumbar support.

SUMMARY OF THE INVENTION

The present invention is directed to an improved seat that provides adjustable, specific, stabilizing support, and contoured fit to a user's sacrum and sacral-pelvic anatomy. The present invention provides such support within a lower portion of the interior of the seat back. The improved seat effects changes in a user's sacral anatomy that result in user efficiency, strength, and muscle control. That is, the improved seat actively targets and controls specific portions of the sacrum, thereby increasing the comfort, endurance, and stability of a user. Additionally, the improved seat actively targets and controls specific portions of the sacrum even while the seatback is in a variety of positions, e.g., reclined or erect. This is accomplished in an adjustable, convenient manner for users who differ from each other in proportion and size. Furthermore, the present invention provides anatomically contoured fit by offering a surface match between the contours of a user's anatomy and the seating surface.

According to a first aspect of the present invention, a sacral support assembly for use with a seat is provided. The seat includes a seat frame. An adjustable sacral support assembly is connected to the seat frame. The sacral support assembly includes a sacral support member adapted to support the sacrum of a seated user.

According to a second aspect of the present invention, a sacral support assembly for use with a vehicle seat is provided. The vehicle seat includes a seat frame. An adjustable sacral support assembly is connected to the seat frame. The sacral support assembly includes a sacral support member adapted to support the sacrum of a seated user.

According to another aspect of the invention, a sacral support element for a vehicle seat having a seat back is provided. The sacral support element includes a support member, a cam, and a sacral support member. The support member is connected to an interior frame of the seat. The cam is connected to the support member. The sacral support member has a front and a rear surface. The front surface engages a front portion of the seat back. The rear surface of the sacral support member engages the cam.

According to yet another aspect of the invention, a sacral support element for a vehicle seat having a seat back is provided. The sacral support element includes a support member, a flexible extension member, and a sacral support member. The support member is connected to an interior frame of the automobile seat. The flexible extension member is connected to the support member and is moveable with respect to the support member. The sacral support member is connected to the extension member and is moveable toward and away from a front portion of the seat back. A load distribution surface is also provided for controlling the load distribution to the anatomical structures adjacent to a user's sacrum, for example, the pelvic and lumbar regions.

As used herein the term "connected to" is intended to be interpreted broadly and to include direct and indirect connections.

As used herein the term "vehicle" is intended to be interpreted as broadly including transportation-related applications in general, for example, automobiles, airplanes, boats, trains, wheelchairs, etc.

These and other features, aspects, and advantages of the present invention will become better understood with reference to the following description, appended claims, and accompanying drawings where:

BRIEF DESCRIPTION OF THE DRAWINGS

FIG. 2 is a sectional side view of a first embodiment of the present invention;

FIG. 3 is a sectional side view of a first embodiment of the present invention including an automobile seat;

FIG. 9 is a sectional side view of a second embodiment of the present invention illustrating the lumbar support member and the sacral support member in disengaged positions;

FIG. 10 is a sectional side view of a second embodiment of the present invention illustrating the lumbar support member in an engaged position and the sacral support member in a disengaged position;

FIG. 11 is a sectional side view of a second embodiment of the present invention illustrating the lumbar support member in an engaged position and the sacral support member in an engaged position;

FIG. 28 is a rear view of a fifth embodiment of the present invention with reference to a sacral/lumbar device wherein the position of the sacral support member can be altered synchronously with the lumbar support or by a separate control unit;

FIG. 29 is a rear view of a fifth embodiment of the present invention with reference to a sacral/lumbar device wherein the position of the sacral support member is adjusted independently from the lumbar support;

FIG. 30 is a front view of a sixth embodiment of the present invention with reference to a sacral support member comprising a bladder;

FIG. 31 is a side view of a sixth embodiment of the present invention with reference to a sacral support member comprising a bladder; and FIG. 32 is a perspective plan view of a sixth embodiment of the present invention with reference to a sacral support member comprising a multi-chambered bladder.

FIG. 39 is a perspective view of an eighth embodiment of the present invention with reference to a sacral device in an engaged position;

FIG. 40 is a perspective view of an eighth embodiment of the present invention with reference to a sacral device in a disengaged or retracted position;

FIG. 41 is an exploded perspective view of ninth embodiment of the present invention with reference to a sacral device;

FIG. 42 is a perspective view of a ninth embodiment of the present invention with reference to a sacral device in an engaged position; and FIG. 43 is a perspective view of a ninth embodiment of the present invention with reference to a sacral device in a disengaged or retracted position.

DETAILED DESCRIPTION OF THE PREFERRED EMBODIMENTS

Figure 1:
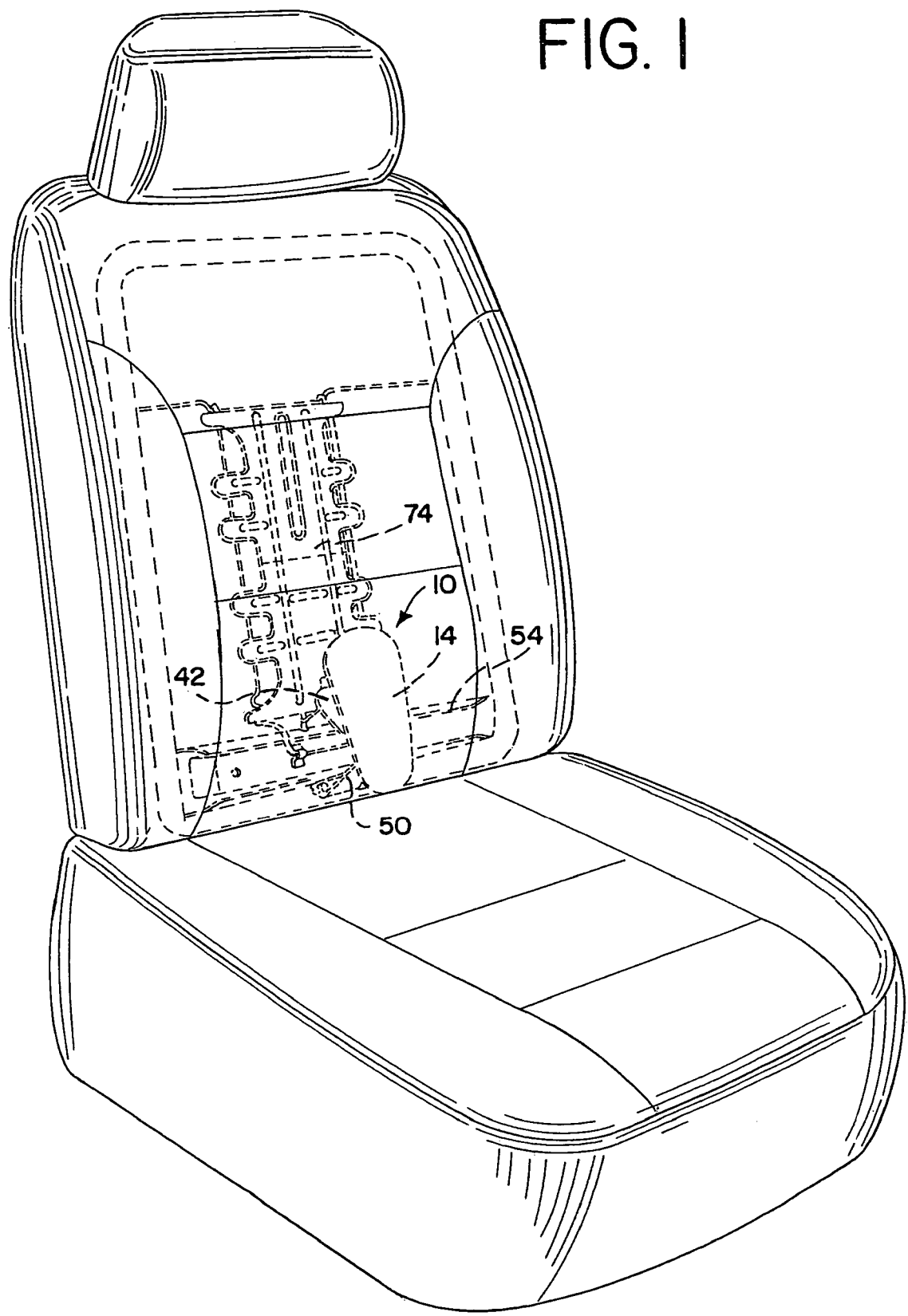
FIG. 1 is a front perspective view of a first embodiment of the present invention.
Figure 4:
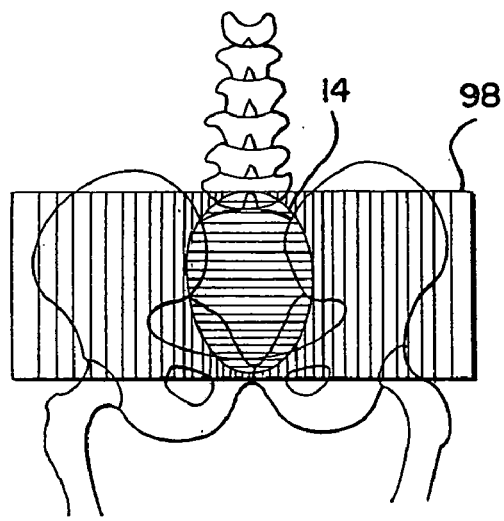
FIG. 4 is a rear sectional view of one embodiment of the present invention with reference to a sacral support member, a load distribution material and the general lumbar, sacral, and pelvic anatomy of a user.

The invention is described with reference to the drawings in which like elements are referred to by like numerals. The relationship and functioning of the various elements of this invention are better understood by the following detailed description. However, the embodiments of this invention as described below are by way of example only, and the invention is not limited to the embodiments illustrated in the drawings. It should also be understood that the drawings are not to scale and in certain instances details have been omitted, which are not necessary for an understanding of the present invention, such as conventional details of fabrication and assembly. Moreover, it should be noted that the invention described herein includes methodologies that have a wide variety of applications, including for example office, residential, and commercial seating applications.

Referring to the drawings, FIGS. 1-3 illustrate a first preferred embodiment of the present invention, and particularly, an adjustable sacral support element 10. The adjustable sacral support element 10 shown in FIG. 2 in general comprises sacral support member 14, hinge 30, cam 42, hinge 46, mounting bracket 54, lever arm 50, actuator cable 80, and angle limiter 68. Generally, sacral support member 14 is attached by hinge 30 to an outer surface of cam 42. Cam 42, in turn, is attached by hinge 46 to mounting bracket 54, which is fixed to the seatback frame. A lever arm 50 is pivotally attached to mounting bracket 54. Lever arm 15 is actuated by actuator cable 80.

FIG. 1 illustrates a first embodiment of the present invention in which sacral support member 14 provides a supporting surface engineered to support the sacrum and sacral-pelvic anatomy of a user. Sacral support member 14 is located at a lower, central portion of seatback frame 4. The location of sacral support member 14 coincides with the sacral area of a seated person. Sacral support member 14 preferably is formed of a substantially rigid material, such as steel, plastics, or carbon fiber, but materials providing a similar level of support can also be used. Sacral support member 14 is generally flat, pear-shaped, and oriented with a larger width at a top portion and a smaller width at a bottom portion. This shape and orientation coincides with the shape and orientation of the sacrum of a user. More specifically, an upper portion of sacral support member 14 has a horizontal width of approximately 3.25 inches. A lower portion of sacral support member 14 has a horizontal width of approximately 2.6 inches. Preferably, the vertical length of sacral support member 14 is approximately 5.25 inches.

The top width of sacral support member 14 can vary from 3 times the width of the sacrum of a user at the level of the sacral base of the user to approximately equal to the width of the sacrum of a user at the level of the sacral base of the user. The width of sacral support member 14 decreases progressively from a top portion to a bottom portion of sacral support member 14. The width of the bottom portion is approximately greater than or equal to the width of the sacrum of a user at a level corresponding with the bottom portion. However, as discussed below, the dimensions of the sacral support member 14 may vary depending on a variety of factors.

Figure 5:
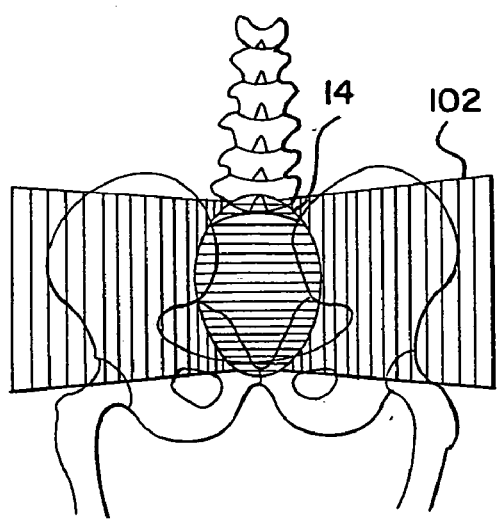
FIG. 5 is a rear sectional view of one embodiment of the present invention with reference to a sacral support member, a load distribution material and the general lumbar, sacral, and pelvic anatomy of a user.
Figure 6:
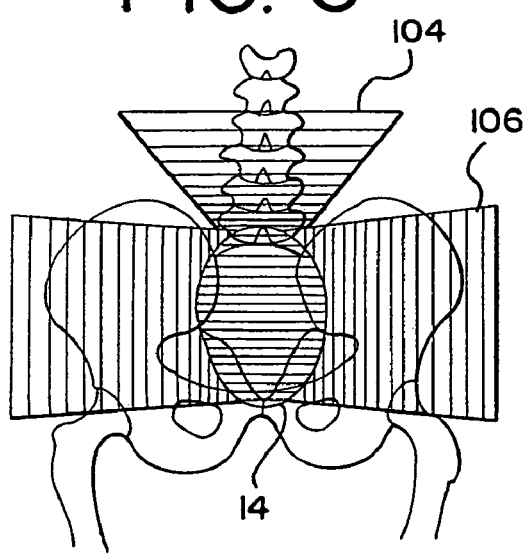
FIG. 6 is a rear sectional view of one embodiment of the present invention with reference to a sacral support member, a load distribution material and the general lumbar, sacral, and pelvic anatomy of a user.
Figure 7:
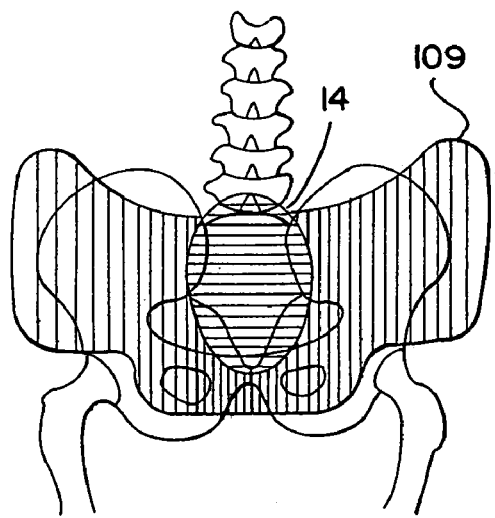
FIG. 7 is a rear sectional view of one embodiment of the present invention with reference to a sacral support member, a load distribution material and the general lumbar, sacral, and pelvic anatomy of a user.

Since sacral support member 14 is preferably rigid and mainly supports the sacrum, it is preferable to provide a load distribution material between sacral support member 14 and the sacrum of a user, as illustrated in FIGS. 4-7. For example, in FIG. 4, load distribution material 98 provides a surface that adjusts to the contours of the sacrum and sacral-pelvic area of a user. Additionally, in the preferred embodiment shown in FIG. 4, load distribution material 98 provides a contoured, nesting area for the PSIS's of the ilias, and the ilias. Other preferred arrangements and designs of the load distribution material are illustrated in FIGS. 5-7. For example, FIG. 5 illustrates an embodiment in which the load distribution material 102 is partially butterfly-shaped. FIG. 6 illustrates and embodiment in which two load distribution materials, 104 and 106, are provided. FIG. 7 illustrates a load distribution material 109 designed to generally cover the anatomical surfaces of the sacral-pelvic area, while also avoiding the PSIS's of the ilias.

In practice, when sacral support member 14 is in an engaged position, the load distribution material preferably improves load distribution across soft tissues of the sacral area of the user and avoids localized pressure on the PSIS's of the ilias. Accordingly, in a first preferred embodiment, primary support for the sacrum, e.g., sacral support member 14, may be combined with a secondary support for the sacrum and the surrounding tissues, e.g., a load distribution material.

Preferably, conventional support materials may be used to provide load distribution, such as compressed foams, plastics or strips of lightweight metals, for example aluminum. The size and shape of the load distribution material may be altered to accommodate the user's specific anatomical contours, and provide further improved support and fit, and depending on the trim of a seat. For example, it may be desirable to provide additional load distribution material at the outer portions of sacral support member 14.

In addition, cushioning is preferably provided between the user, the front portion of the seatback and load distribution material. The cushioning may be formed of conventional cushioning materials, such as, foam. Accordingly, in a preferred embodiment, a front portion of the seatback is followed by a cushioning, which is followed by a load distribution material, which is followed by sacral support member 14.

It should be understood that the amount of load distribution material and cushioning and the size of the sacral support member are related, and may be altered while still achieving the desirable levels of sacral support and contoured fit. For example, to a limited extent, a sacral support member having smaller dimensions than discussed above may be used if a relatively large load distribution material or cushion is provided between the sacral support member and the user. Conversely, a larger sacral support member than suggested above may be used if relatively less cushioning and load distribution material is provided between the sacral support member and the user. Also, the sacral support member, the load distribution material and cushion may be formed of a unitary structure while still achieving the preferred results of sacral support and contoured fit.

As illustrated in FIG. 1, sacral support member 14 is connected to cam 42 by hinge 30, which allows the sacral support member 14 to tilt to an angle between about 40 and 85 degrees. It should be understood that in the first preferred embodiment the location of hinge 30 with respect to sacral support member 14 and cam 42 permits sacral support member 14 to pivot or recline at a proper point in relation to the sacrum of a user and thus adapt to the natural tilt of a user's sacrum. It should also be noted that in the preferred embodiment shown in FIG. 1, the lateral position of sacral support element 14 adjusts automatically as a users reclines against the seat back. That is, sacral support member 14, partially adjusts to accommodate the lateral position of the sacrum or sacral-pelvic area of a user. Cam 42 is curved or bowed to receive end 50a of lever arm 50. Cam 42 is made of steel or another rigid material that is able to withstand and overcome an inward load created by a user's weight. Cam 42 is connected to mounting bracket 54 by hinge 46.

As illustrated in FIG. 1, mounting bracket 54 is fixed (e.g., welded) to a rigid portion of an interior seat frame at a position that may vary depending on the size and shape of the seat back frame, the amount and size of padding between sacral support member 14, and the type of trim package used as the seat exterior. As further illustrated in FIG. 2, an upper portion of mounting bracket 54 receives end 50a of lever arm 50. A middle, lower portion of mounting bracket 54 has a rear facing surface 54a, at which bracket 84 is attached. Bracket 84 is fin-shaped, steel or any other rigid material, and provides an attachment point for non-retained connection 88. A lower portion of mounting bracket 54 provides an upwardly coiled end 54b where lever arm 50 is pivotally connected.

Lever arm 50 has first and second ends 50a, 50b. First end 50a is curved, and second end 50b is linear. Lever arm 50 is pivotally connected to mounting bracket 54 in such a way that lever arm 50 pivots about retaining pin 64. Return spring 60 is provided at the pivotal connection between lever arm 50 and mounting bracket 54. Return spring 60 urges lever arm 50 towards a disengaged position. Angle limiter 68 is connected to a rear surface of sacral support member 14 and lever arm 50. Angle limiter 68 is a thin chain, or may any other limiting device which can readily bend and has a tensile strength sufficient to limit the travel of sacral support member 14, cam 42 and lever arm 50.

Actuator cable 80 is connected at a first end to linear end 50b of lever arm 50. Actuator cable 80 connected to linear end 50b by hook 104, but may also be connected thereto with other connectors such as a clamp. A second end of actuator cable 80 is operatively connected to either a manual adjust mechanism or a motorized adjust mechanism. This adjust mechanism is readily accessible to a user and provides a simple instrument for actuating actuator cable 80. A central portion of actuator cable 80 passes through cable housing 92. Cable housing 92 is attached by loose, or non-retained connection 88 to bracket 84.

In operation, a user determines the amount of desired sacral support and then operates sacral support element 10 to deliver that amount of sacral support. In a disengaged position sacral support member 14 provides minimal or no support to a user's sacrum or sacral area. As desired, a user may adjust the position sacral support member 14 toward the user's sacrum to provide increased support. As illustrated in FIG. 3, the user may adjust the position of sacral support member 14 to a maximum or fully engaged position that provides maximum support. The user may thus directly control and manage load distribution to provide support, fit, and comfort.

In a preferred embodiment, in the engaged position, sacral support member 14 extends approximately between 1.5 inches and 3 inches forward with respect to a plane created by a user's back. It has been discovered that delivering sacral support member 14 a distance greater than about 3 inches forward of the plane created by a user's back is unnecessary. Accordingly, the preferred embodiment of sacral support element 10 shown in FIGS. 1-3 is designed to optimally deliver sacral support member 14 up to 3 inches forward of the plane created by the user's back. Notwithstanding this, alternate embodiments of the present invention may deliver sacral support member 14 a maximum distance greater than 3 inches forward of the plane created by a user's back, or a maximum distance less than 3 inches forward of the plane created by a user's back.

The overall distance of travel of sacral support member 14 toward the user depends on a variety of factors. For example, the overall distance of travel of sacral support member 14 may change depending on the location of mounting bracket 54 within a seat frame, the size of the seat frame, the type of material used to cover the seat, and the thickness of any cushioning and load distribution material that may be located between the seat cover and sacral support member 14.

Adjustment between the engaged and disengaged positions is accomplished by controlling a manual or motorized mechanism that actuates actuator cable 80. As actuator cable 80 is actuated, lever arm 50 pivots. Specifically, linear end 50b pivots in a direction upward and away from the user (counterclockwise) and curved end 50a pivots downward and toward the user. As curved end 50a pivots downward and toward the user, curved end 50a engages cam 42, and in particular, curved surface 42a of cam 42. This engagement forces cam 42 to pivot about hinge 46 toward the user and in an upward direction (clockwise). As a result, sacral support member 14 concurrently moves toward the user and slightly upward. To prevent curved portion 50a from becoming jammed against cam 42 in an engaged position, angle limiter 68 is provided. Angle limiter 68 prevents the movement of curved end 50a beyond the lower end of cam 42.

Additionally, in a preferred embodiment, sacral support element 10 does not provide entirely rigid, unyielding support. That is, in a preferred embodiment, to a limited extent sacral support element 10 yields or "flexes" to absorb the shock from various typical road conditions, such as bumps or vibrations. That is, sacral support element 10 is somewhat resilient or elastic.

Adjustable sacral support element 10 is also capable of use in cooperation with lumbar support 74, which provides additional support for the lumbar region of the spine. As described below, sacral support 14 may be used either independently of or concurrently with lumbar support 74 to provide varying levels of support for both the lumbar and sacral areas of a user. For example, both sacral support member 14 and lumbar support 74 may be used in a fully engaged position to provide substantial support for the lumbar and sacral areas of a user. Similarly, adjustable sacral support member 14 may be used cooperatively with a pelvic support.

Figure 8:
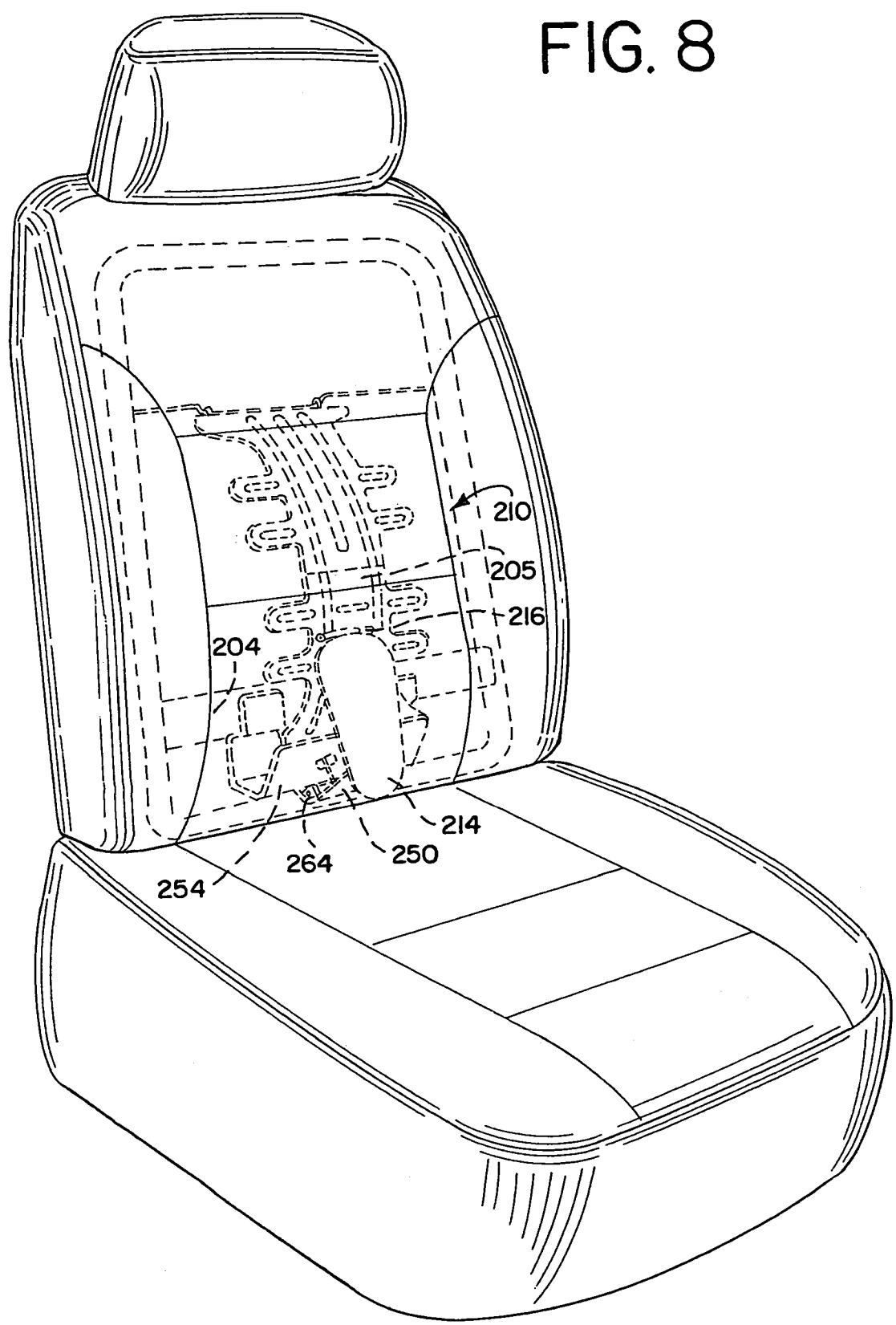
FIG. 8 is a front perspective view of a second embodiment of the present invention.

Referring to the drawings, FIGS. 8-11 illustrate a second preferred embodiment of the present invention, and particularly, an adjustable sacral/lumbar support element 210. The adjustable sacral/lumbar support element 210 shown in FIG. 8 in general comprises seatback frame 204, sacral support member 214, lumbar support member 205, a load distribution material having cushioning (not shown), hinge 216, lever arm 250, and lever securing pin 264. Generally, sacral support member 214 is attached to lumbar support member 205 by hinge 216. A lower portion of lumbar support member 205 is attached to seat frame 204. In addition, lever arm 250 is pivotally mounted to a lower portion of the seat frame 204. Lever arm 250 is actuated by actuator cable 280 (not shown in FIG. 8). In the second preferred embodiment of the present invention, a conventional lumbar support 205 is operatively connected to seatback frame 204 by mounting bracket 254, for example, by soldering. A variety of lumbar support devices are widely available, such as a 2-way electrical metal lumbar support sold under the trademark "Model L," which is available from Schukra, a subsidiary of Leggett & Platt, Inc. Such lumbar support members are typically controlled by a motorized adjust mechanism, which a user controls by operating a control instrument. Alternatively, such lumbar support members may be controlled by a manual adjust mechanism. Lumbar support 205 provides a surface for attaching the sacral support member by a hinge. In particular, as illustrated in FIG. 8, sacral support member 214 is attached to a middle or lower portion of lumbar support 205 by hinge 216.

As illustrated in claims 9-11, sacral support member 214 provides a supporting surface engineered to coincide with and support the sacrum and sacral-pelvic anatomy of a user. Sacral support member 214 is located at a lower, central portion of seatback frame 204. As in the first embodiment, the location of sacral support member 214 coincides with the sacral area of a seated person. Sacral support member 214 preferably is formed of a substantially rigid material, such as steel, plastics, or carbon fiber, but materials providing a similar level of support can also be used. Additionally, a load distribution material and cushioning as described with regard to the first embodiment is preferably provided between the user and the sacral support member in accordance with the principles described above.

Sacral support member 214 is generally flat, pear-shaped, and oriented with a larger width at a top portion and a smaller width at a bottom portion. This shape and orientation coincides with the shape and orientation of the sacrum of a user. More specifically, an upper portion of sacral support member 214 has a horizontal width of approximately 3.25 inches. A lower portion of sacral support member 214 has a horizontal width of approximately 2.6 inches. Preferably, the vertical length of sacral support member 214 is approximately 5.25 inches, but may be longer or shorter depending on its proximity to the seatpan. Additionally, sacral support member 214 may curve slightly towards the user.

The top width of sacral support member 214 may vary from 3 times the width of the sacrum of a user at the level of the sacral base of the user to approximately equal to the width of the sacrum of a user at the level of the sacral base of the user. The width of sacral support member 214 decreases progressively from a top portion to a bottom portion of sacral support member 214. The width of the bottom portion is approximately greater than or equal to the width of the sacrum of a user at a level corresponding with the bottom portion. It should be noted, however, that the dimensions of sacral support member 214 may be altered in accordance with the principles set forth above regarding the relationship between the sacral support member, load distribution materials, and cushioning.

Sacral support member 214 further includes a front surface and a back surface. The front surface of sacral support member 214 is configured to face the sacrum of a user, while the back surface is configured to receive lever arm 250. As noted above, an upper portion of sacral support member 214 is attached by hinge 216 to lumbar support member 205. Hinge 216 is a conventional hinge that is soldered to lumbar support member 205.

In the second preferred embodiment, the sacral support member is moved into a fully engaged position by a lever arm located behind the sacral support member where a lubricant or a lubricious surface may be provided to facilitate the movement of the lever arm. For example, as illustrated in FIG. 11, lever arm 250 is used to move sacral support member 214 into a fully engaged position. Lever arm 250 preferably is formed as a flat member having a front edge and a rear lip that defines a rear edge. Lever arm 250 is formed from a rigid material, such as steel, plastic, or carbon fiber. As illustrated in FIG. 8, lever arm 250 is pivotally attached by pin 264 to mounting bracket 254, which is located behind sacral support member 214. In turn, mounting bracket 254 is attached to seatback frame 204. Additionally, a return spring is provided about pin 264 so as to return lever arm 250 to a disengaged position.

As illustrated in FIGS. 9-11, actuator cable 280 is connected at a first end to the rear lip of lever arm 250. A second end of actuator cable 280 is operatively connected to a conventional motorized adjust mechanism 207 or, alternatively, to a manual adjust mechanism. The adjust mechanism is readily accessible to a user and provides a simple instrument for actuating actuator cable 280. Actuator cable 280 passes through a central portion of cable housing 292. Preferably, cable housing 292 is attached by a loose, or non-retained connection to mounting bracket 254.

In a preferred embodiment, the user alters the position of the sacral support member by operating the actuator motor 207, which actuates actuator cable 280. This actuation causes the rear edge of lever arm 250 to pivot upward, and the front edge of lever arm 250 to move downward and toward the sacrum of a user. As the front edge of lever arm 250 moves downward and toward the sacrum of a user, the front edge engages the rear surface of sacral support member 214, thus progressively urging the front surface of sacral support member towards the sacrum of a user. To disengage the sacral support member, the user operates the motor to effectively lengthen actuator cable 280. Return spring 260 then causes lever arm 250 to pivot back to a disengaged position. Consequently, a user is able to move the sacral support member 214 to a desired support position.

As illustrated in FIGS. 9-11, in the second embodiment of the invention, the lumbar support member and sacral support member may be adjusted through a range having four distinct support positions. In a first support position, illustrated at FIG. 9, lumbar support member 205 and sacral support member 214 are disengaged and provide little or no lumbar or sacral support. In a second position, illustrated at FIG. 10, lumbar support member 205 is engaged and provides maximum support, while sacral support member 214 is disengaged provides little support, albeit more support than when lumbar support member 205 is in a disengaged position. In a third position (not shown), the lumbar support member is disengaged and provides minimal lumbar support, while the sacral support member is fully engaged and provides maximum sacral support. In a fourth position, illustrated at FIG. 11, both the lumbar support member and the sacral support member are fully engaged and provide a maximum amount of sacral and lumbar support. It should be noted, therefore, that in a preferred embodiment both the lumbar support member and the sacral support member are fully independent of each other and may be operated independently by separate adjust mechanisms. Notwithstanding this, the lumbar support member and the sacral support member may also be configured to operate dependently, that is, both the lumbar support member and the sacral support member being operated by a single adjust mechanism and/or control instrument.

In operation, a user determines the amount of desired lumbar and sacral support and then operates the respective adjust mechanisms to deliver the desired amount of support. For example, lumbar support member 205 may be adjusted to a desired position by activating the lumbar support adjust mechanism. The sacral support member may then be adjusted to a desired position by activating the sacral support adjust mechanism. Alternatively, the sacral support member may be adjusted first, and the lumbar support member thereafter.

Figure 12:
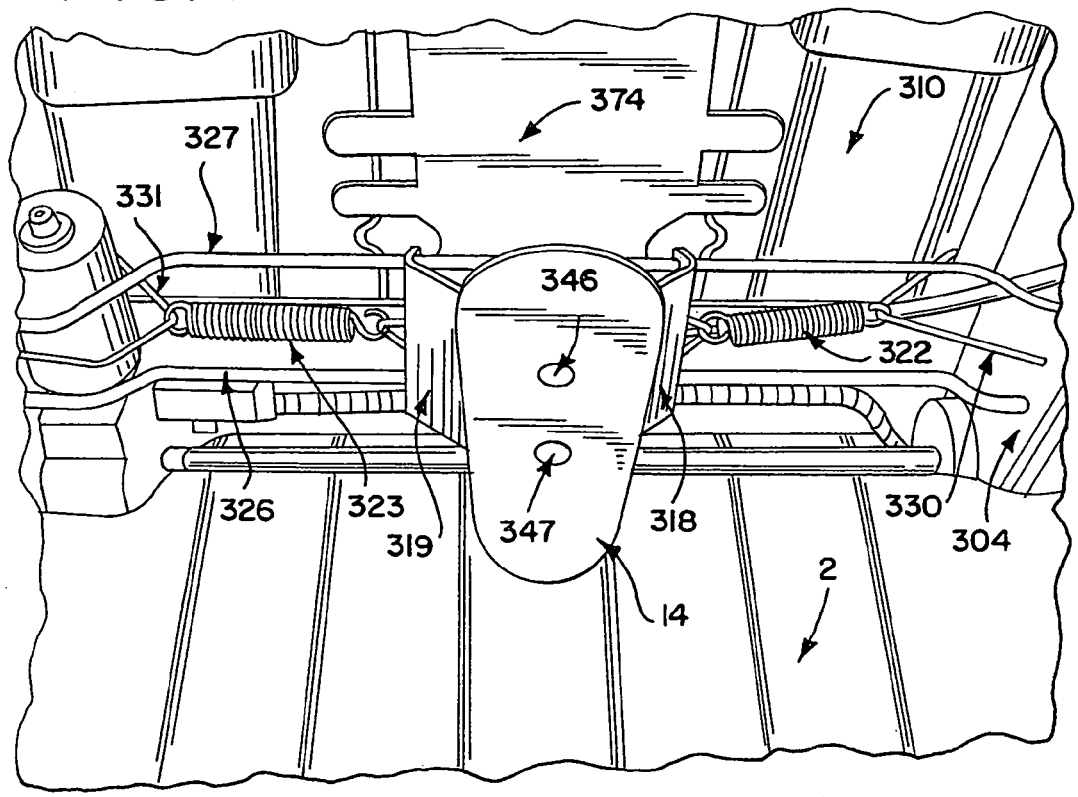
FIG. 12 is a front perspective view of a third embodiment of the present invention.
Figure 13:
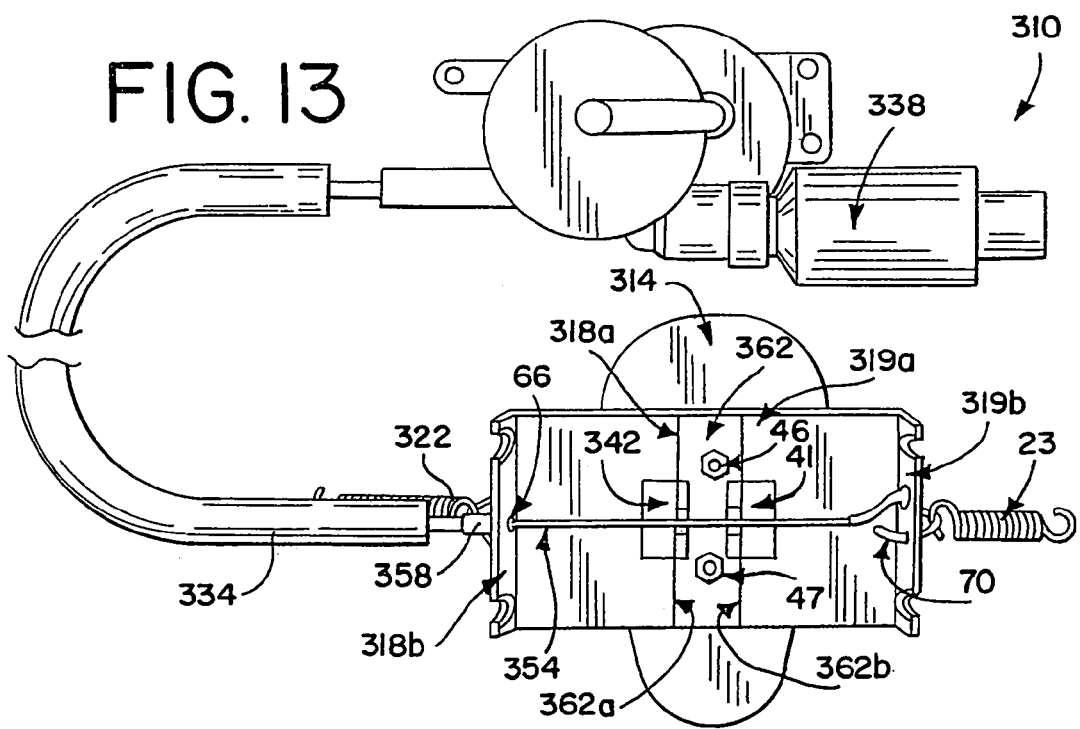
FIG. 13 is a rear view of one embodiment of the present invention with reference to a sacral support member, an attachment member, hinges, extension plates, an actuator cable, and a motor.

Referring to the drawings, FIGS. 12-13 illustrate a third preferred embodiment. The adjustable sacral support element 310 shown in FIGS. 12-13 generally comprises sacral support member 314 attached by hinges 342 and 343 to extension plates 318 and 319. Extension plates 318 and 319 are provided with grooves that allow extension plates 318 and 319 to slide over slide wires 326 and 327. Actuator cable 354 draws together extension plates 318 and 319, and concurrently moves sacral support member 314 into an engaged position toward the sacral area of a user. Tension spring 322 is attached at one end to extension plate 318 and at another end to the seatback frame 34. Tension spring 323 is attached at one end to extension plate 319 and at another end to seatback frame 34.

FIG. 12 illustrates a third preferred embodiment of the present invention in which sacral support member 314 provides a supporting surface engineered to support the sacrum and sacral-pelvic anatomy of a user. Sacral support member 314 is located at a lower, central portion of seatback frame 34. The location of sacral support member 314 coincides with the sacral area of a seated person. Sacral support member 314 preferably is formed of a substantially rigid material, such as steel, plastics, or carbon fiber, but materials providing a similar level of support can also be used. Sacral support member 314 is generally flat, pear-shaped, and oriented with a larger width at a top portion and a smaller width at a bottom portion. This shape and orientation coincides with the shape and orientation of the sacrum of a user. More specifically, an upper portion of sacral support member 314 has a horizontal width of approximately 3.25 inches. A lower portion of sacral support member 314 has a horizontal width of approximately 2.6 inches. Preferably, the vertical length of sacral support member 314 is approximately 5.25 inches.

The top width of sacral support member 314 can vary from 3 times the width of the sacrum of a user at the level of the sacral base of the user to approximately equal to the width of the sacrum of a user at the level of the sacral base of the user. The width of sacral support member 314 decreases progressively from a top portion to a bottom portion of sacral support member 314. The width of the bottom portion is approximately greater than or equal to the width of the sacrum of a user at a level corresponding with the bottom portion. However, as discussed below, the dimensions of the sacral support member 314 may vary depending on a variety of factors.

As noted above, since sacral support member 314 is rigid, it is preferable to provide a load distribution material and/or a cushion between sacral support member 314 and the sacrum of a user. The load distribution material and cushioning is formed in accordance with the load distribution and cushioning principles described above in detail. As detailed above, the load distribution material and cushioning improve load distribution across soft tissues of the sacral area of the user. This results in enhanced pelvic stabilization, support, and contoured fit. This further results in natural and controlled nesting of the two pelvic ilias. Preferably, conventional types of cushioning may be used, such as compressed foam. To provide further improved support and fit, and depending on the trim of a seat, the size and shape of the cushion may be varied. For example, it may be necessary to provide more cushioning at the outer portions of sacral support member 314.

As illustrated in FIG. 12, sacral support member 314 is attached to attachment plate 362 (shown in FIG. 13) by bolts 346 and 347. Sacral support member 314 may alternatively be formed integrally with attachment plate 362. Attachment plate 362 is formed of a substantially rigid material, such as steel, plastic, or carbon fiber. The dimensions of attachment plate 362 are approximately 2.75 inches by 0.5 inch. A first end 362a of attachment plate 362 is pivotably connected by hinge 342 to a first end 318a of extension plate 318. A second end 362b of attachment plate 362 is pivotably connected by hinge 343 to a first end 319a of extension plate 319. This double hinge construction allows sacral support member 314 to pivot approximately about a central vertical axis. Extension plates 318 and 319, which are likewise formed of a substantially rigid material in the present embodiment of the invention, each have a second edge (318b and 319b, respectively), which is slidably mounted to slide wires 326 and 327. It should be noted that extension plates of varying flexibility may alternatively be used. For example, the use of more flexible extension plates alters the spring characteristics of sacral support element 310. Extension plates 318 and 319 have a length of approximately 2.75 inches and a width of approximately 2.75 inches. Second ends 318b and 319b are bent towards the rear of the seatback and have grooves that are adapted to slidably receive slide wires 326 and 327. In particular, the grooves are provided with non-abrasive o-rings that facilitate sliding over slide wires 326 and 327.

Slide wires 326 and 327 are fixed directly to a lower portion of seatback frame 34. In a preferred embodiment of the present invention, slide wires 326 and 327 are horizontally attached in a parallel configuration to a lower part of frame 34. Slide wires 326 and 327 are made of a material, preferably steel, that is able to partially withstand a rearward force created by a user reclining against sacral support member 314, but also flex to a limited extent. As a user reclines against sacral support member 314, the user's sacrum creates a backward force on sacral support member 314. This backward force is distributed to slide wires 326 and 327. The force causes slide wires 326 and 327 to flex. As slide wires 326 and 327 flex, sacral support member 314 tilts backward at an angle that substantially coincides with the tilt of a user's sacrum. As a result, sacral support member 314 automatically adjusts to the natural tilt of a user's sacrum, while simultaneously providing an adjustable supporting force.

As illustrated in FIG. 13, an actuator cable is provided to move the sacral support member between engaged and disengaged positions. Actuator cable 354 is housed in cable housing 334. One end of cable housing 334 terminates in a non-retained connector 358, which is connected to and passes through second end 318b of extension plate 318. Actuator cable 354 passes through aperture 366 of extension plate 318. Terminal end 354a of actuator cable 354 is provided with hook 370, which is connected to second edge 319b of extension plate 319. Motor 338 is controlled by a user to extend and retract actuator cable 354.

As illustrated in FIG. 12, extension plate 318 is connected to a first end of tension spring 322 and extension plate 319 is connected to a first end of tension spring 323. A second end of tension spring 322 is connected to a lower portion of seatback frame 34. Similarly, a second end of tension spring 323 is connected to a lower portion of seatback frame 34. Tension springs 322 and 323 maintain extension plates 318 and 319 slidably mounted on the slide wires. Further, tension springs 322 and 323 maintain sacral support member 314 centered between the sides of the seatback. Further still, tension springs 322 and 323 create a return force that biases the extension plates to a disengaged position, as illustrated in FIG. 12.

In operation, a user determines the amount of sacral support that is desired and then operates sacral support element 310 to deliver that amount of sacral support. In a disengaged position sacral support member 314 provides minimal or no support to a user's sacrum or sacral area. As desired, a user may adjust the position of sacral support member 314 toward the user's sacral area to provide increased support to that area. As illustrated in FIG. 12, the user may adjust the position of sacral support member 314 to a maximum or fully engaged position that provides maximum support. In the engaged position, sacral support member 314 is approximately between 1.5 inches and 3 inches apart from slider wires 326 and 327. To move sacral support member 314 into an engaged position, a user operates motor 338, which actuates actuator cable 354. This actuation draws together ends 318b and 319b of the extension plates 318 and 319, thus causing the ends to simultaneously slide inwardly toward a center portion of slide wires 326 and 327. Actuation of actuator cable 354 concurrently forces the movement of sacral support member 314 towards a user's sacral area.

As noted above, it has been discovered that delivering the sacral support member a distance greater than about 3 inches beyond a plane created by a seated user's back is unnecessary. Accordingly, the sacral support element 310 shown in FIG. 12 is designed to optimally deliver sacral support member 314 up to 3 inches forward of a plane created by a seated user's back. Notwithstanding this, alternate embodiments of the present invention may deliver sacral support member 314 a distance greater than 3 inches beyond the plane created by a user's back. It should also be noted that the overall distance of travel of sacral support member 314 toward the user depends on a variety of factors. For example, the overall distance of travel of sacral support member 314 may change depending on the location of slide wires 326 and 327 within a seat frame, the size of the seat frame, the type of material used to cover the seat, and the thickness of any padding located between the seat cover and sacral support member 314. These elements or combinations thereof additionally affect the distribution of the support load on the sacrum or sacral-pelvic area of a user.

Adjustable sacral support member 314 is also capable of use in cooperation with lumbar support 374, which provides additional support for the lumbar region of the spine. As detailed above, the sacral support element may be used either independently of or concurrently with lumbar support 374 to provide varying levels of support for both the lumbar and sacral areas of a user. Similarly, adjustable sacral support member 314 may be used cooperatively with a pelvic support.

Referring to the drawings, FIGS. 14-24 illustrate a fourth preferred embodiment of the present invention, and particularly, an adjustable sacral support element 410. The adjustable sacral support element 410 shown in FIG. 14 in general comprises sacral support member 414, bow 417 having terminal ends 421, 423, slide wires 429, 431, and actuator cable 433. The sacral support member is connected to the bow. The bow has terminal ends that are configured to slide laterally across the slide wires. The actuator cable causes the slide brackets to slide over the rods. Specifically, as the actuator cable is taken up, the terminal ends of the bow are drawn together. This causes the bow to flex toward the user, which causes the sacral support member (and to some extent the bow) to engage a user's sacral-pelvic area.

Figure 14:
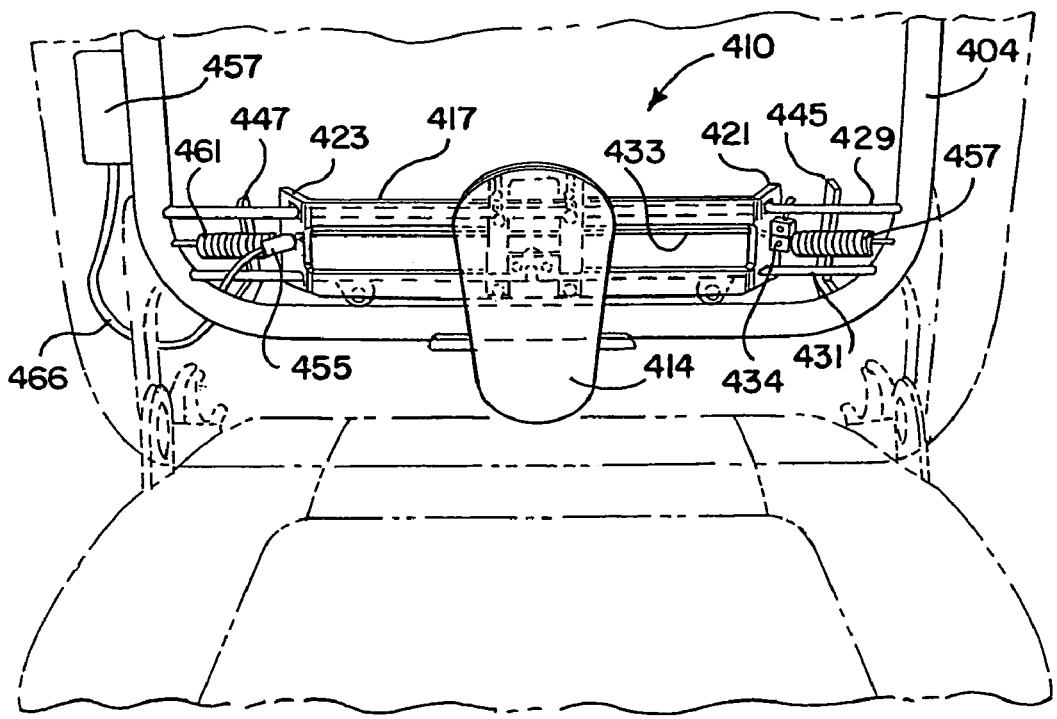
FIG. 14 is a front perspective view of a fourth embodiment of the present invention illustrating the sacral support member in a disengaged position.

FIG. 14 illustrates the fourth preferred embodiment of the present invention in which sacral support member 414 provides a supporting surface engineered to support the sacrum and the sacral-pelvic anatomy of a user. Sacral support member 414 is located at a lower, central portion of seatback frame 404. Sacral support member 414 is attached by a bracket to bow 417. It should be noted that sacral support member 414 is formed in accordance with the detailed description provided above in relation to the previously described embodiments. Since sacral support member 414 is preferably rigid and mainly supports the sacrum, it is preferable to provide a load distribution material between sacral support member 414 and the user's sacral area. The load distribution material is formed in accordance with the detailed description provided for the previously described embodiments. Likewise, the load distribution material is located within the seatback as described in the detailed description provided for the previously described embodiments.

Figure 16:
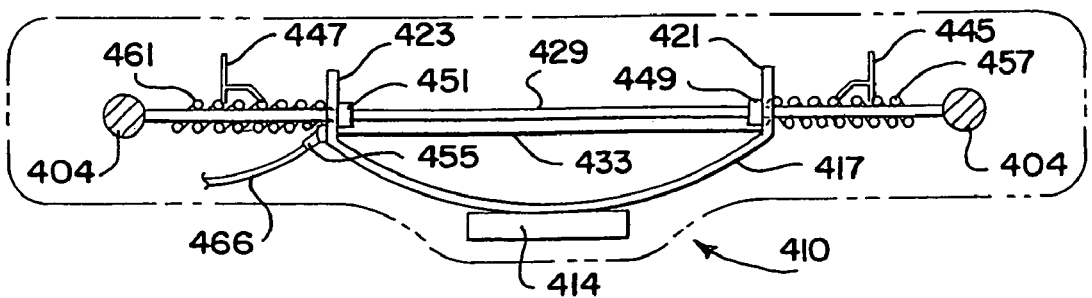
FIG. 16 is a top plan view of a fourth embodiment of the present invention illustrating the sacral support member in an engaged position.

As illustrated in FIGS. 14 and 16, bow 417 forms a linear spring. As the opposing ends of bow 417 slide together over rods 429, 431, i.e., as the linear spring is compressed, a central portion of bow 417 flexes toward the user.

As bow 417 flexes toward the user, sacral support member 414 provides an increasing amount of support to the user's sacrum. Bow 417 is formed of a material that flexes, yet is capable of substantially withstanding a rearward force created by the sacrum of a user. In a preferred embodiment, bow 417 is formed of a semi-rigid material such as aluminum or plastic. As illustrated in FIG. 14, a cutout portion is provided to facilitate flexing of the bow. However, the necessity of a cutout is dictated by the material used to form the bow. More rigid materials will require a cutout, while less rigid materials may be formed without a cutout. The design of the bow is also determined in view of the principles relating to support distribution described below in detail.

Figure 15:
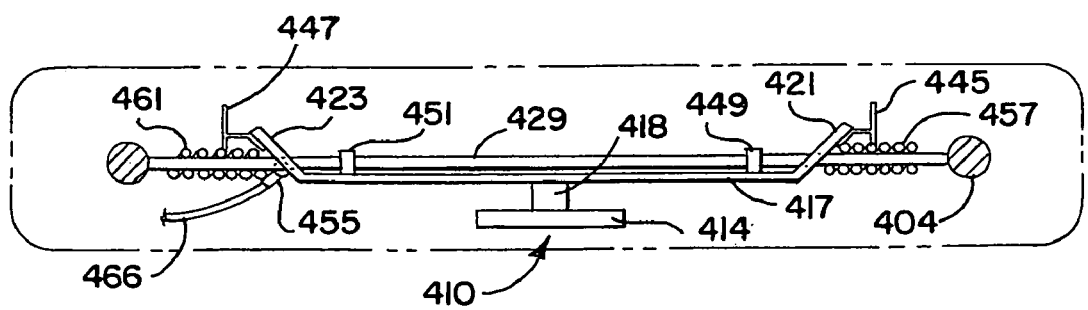
FIG. 15 is a top plan view of a fourth embodiment of the present invention illustrating the sacral support member in a disengaged position.

The distribution of support delivered to a user's sacral-pelvic anatomy can be controlled in several ways. First, the distribution of support can be controlled by changing the distance between the sacral support member and the bow. That is, to deliver generalized sacral-pelvic support, sacral support member 414 is mounted directly onto bow 417. In this configuration, both the sacral support member and the bow provide generalized support to the sacrum and the ilias. In contrast, to deliver localized support to a user's sacrum and ilias, sacral support member 414 is spaced apart from bow 417 by 1-inch spacer 418, as illustrated in FIG. 15. In this configuration, the sacral support member provides localized and relatively isolated support to a user's sacrum, while the bow provides relatively isolated support to a user's ilias. In general, varying the distance between the sacral support member and the bow changes the quality of support (i.e., localized or generalized support) delivered to the sacrum, ilias, and surrounding tissues.

Second, the distribution of support delivered to a user's sacral-pelvic anatomy can be controlled by altering the design of the bow. For example, a bow formed can be formed as a unitary structure as shown in FIG. 16 to provide generalized support. Alternatively, the bow can be contoured to the sacral pelvic anatomy. In another alternative, the bow can be shaped with recesses adapted to receive the ilias of a user.

Figure 17:
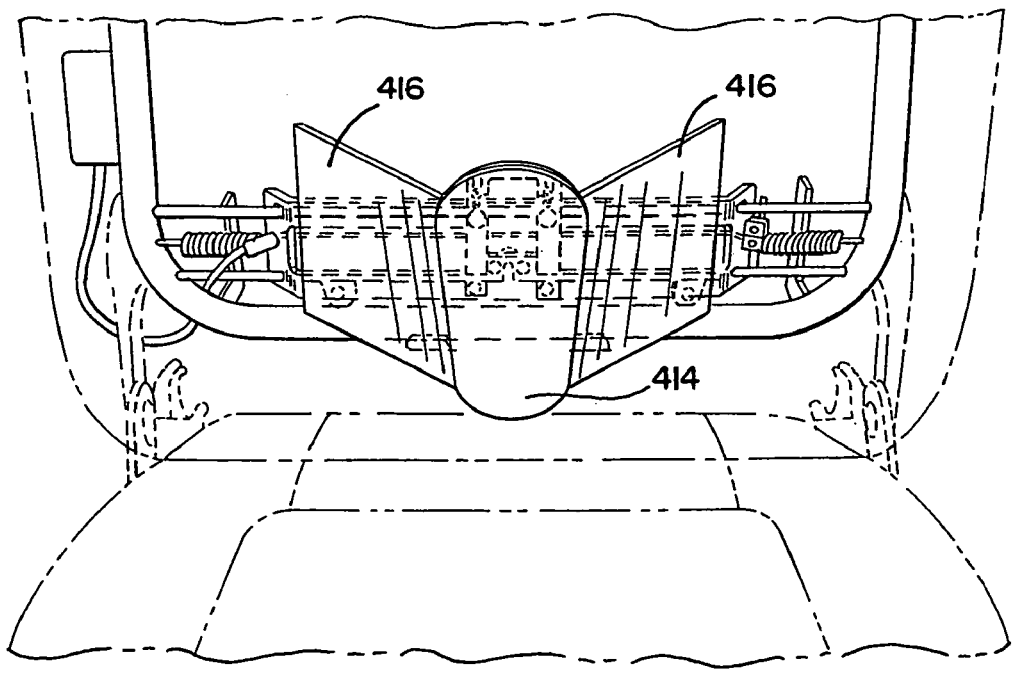
FIG. 17 is front perspective view of a fourth embodiment of the present invention illustrating a sacral support member and a load distribution material.
Figure 18:
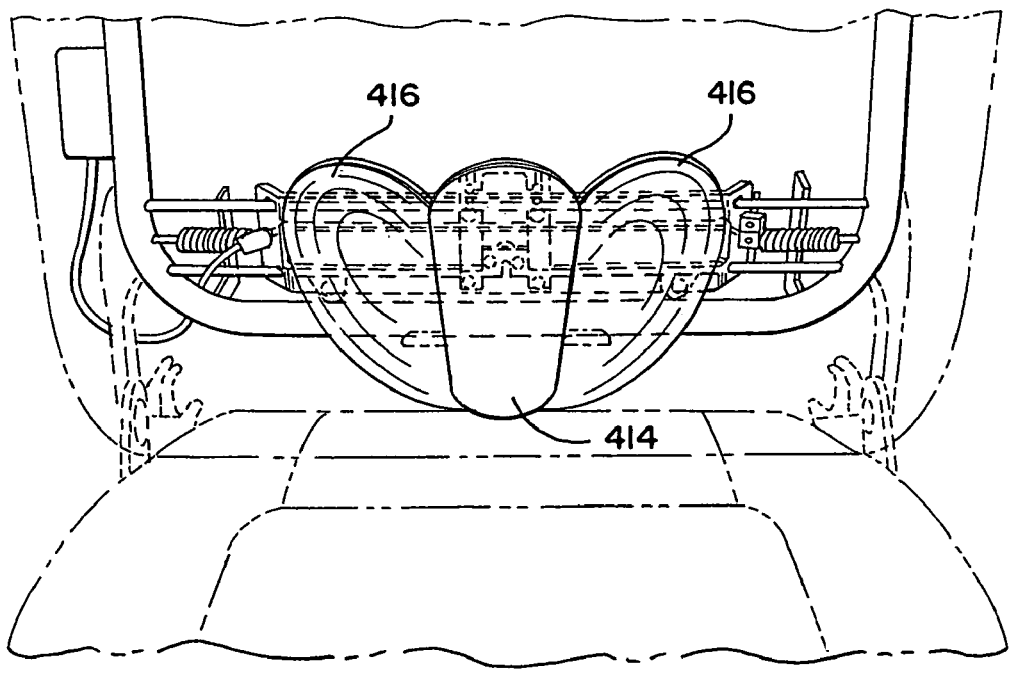
FIG. 18 is a front perspective view of a fourth embodiment of the present invention illustrating a sacral support member and a load distribution material.
Figure 19:
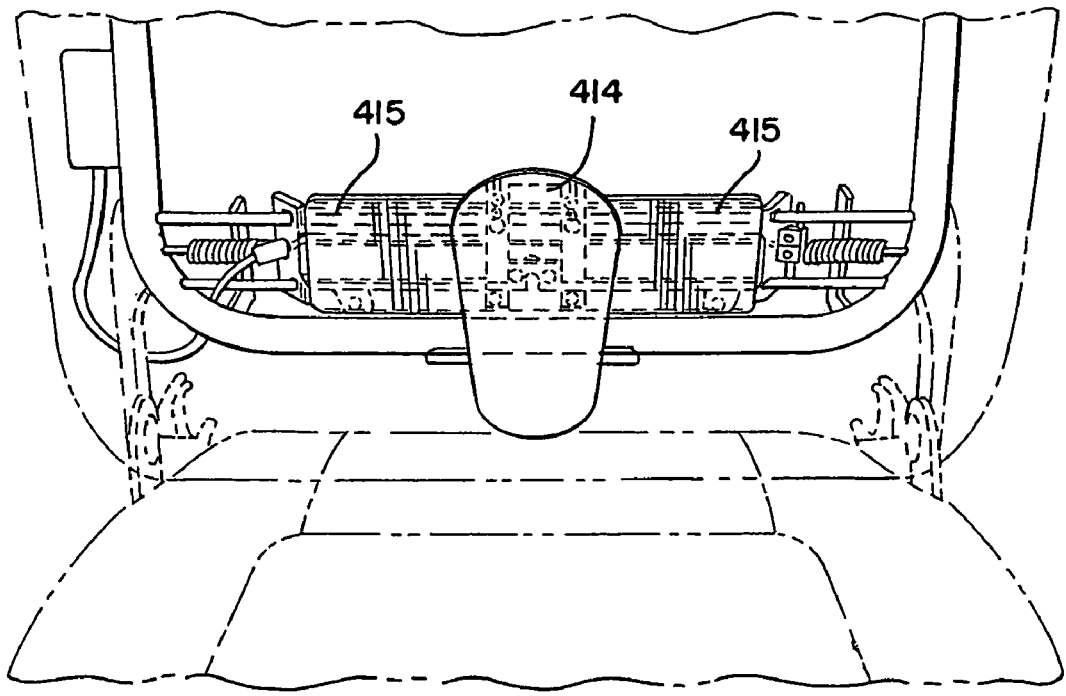
FIG. 19 is a front perspective view of a fourth embodiment of the present invention illustrating a sacral support member and a load distribution material.
Figure 20:
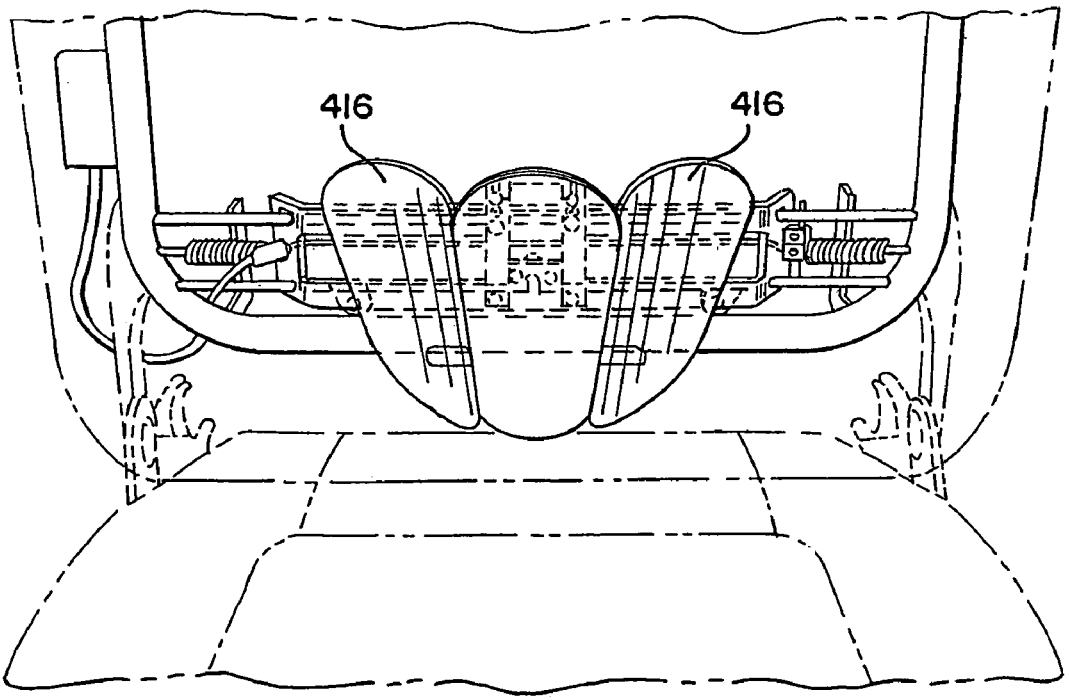
FIG. 20 is a front perspective view of a fourth embodiment of the present invention illustrating a sacral support member and a load distribution material.
Figure 21:
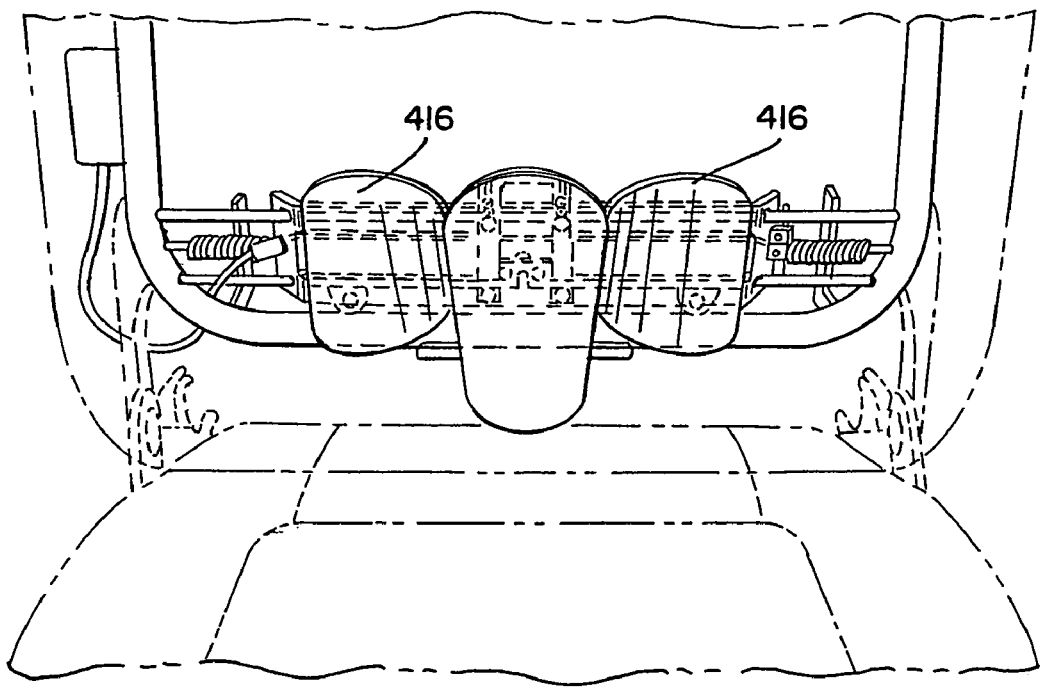
FIG. 21 is a front perspective view of a fourth embodiment of the present invention illustrating a sacral support member and a load distribution material.
Figure 22:
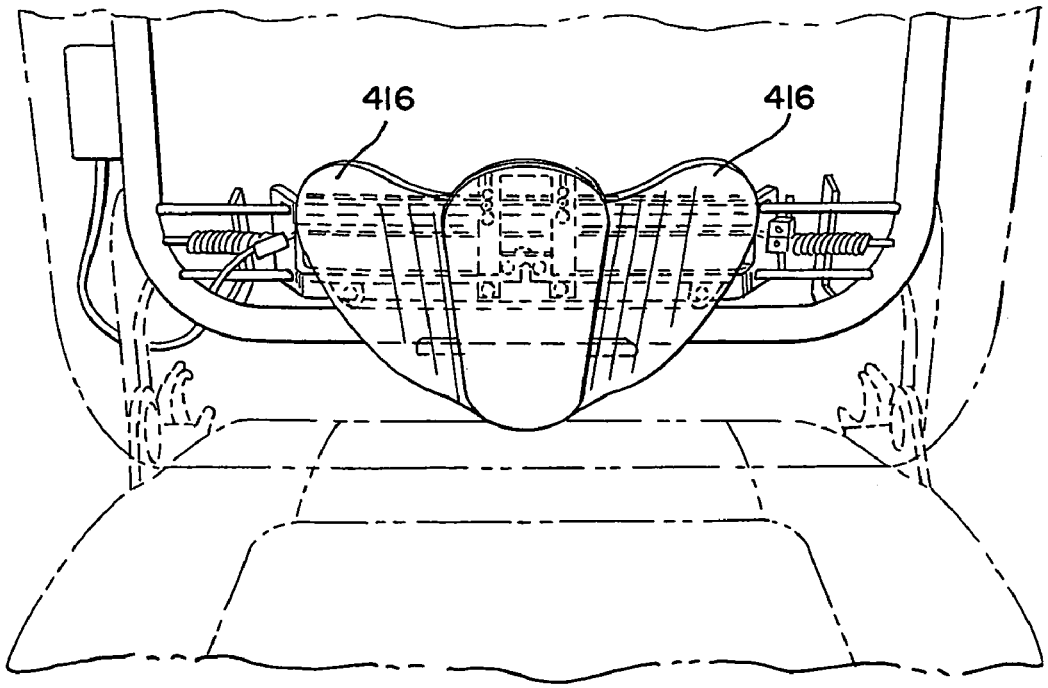
FIG. 22 is a front perspective view of a fourth embodiment of the present invention illustrating a sacral support member and a load distribution material.
Figure 23:
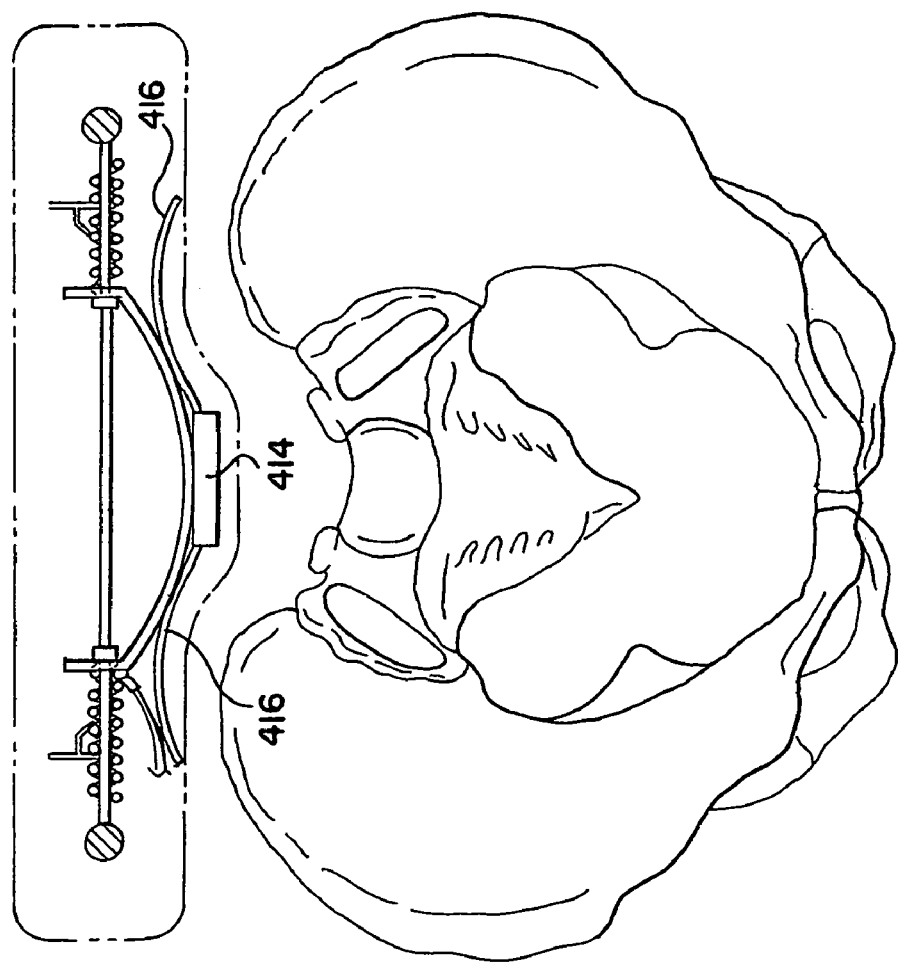
FIG. 23 is a top plan view of a fourth embodiment of the present invention illustrating a sacral support member in an engaged position, and a load distribution material relative to the sacral-pelvic area of a seated user.

Third, the distribution of support delivered to a user's sacral-pelvic anatomy can be controlled by the design, material, and placement of the load distribution material. For example, the load distribution material can be a solid material 415 attached directly to the bow, as illustrated in FIG. 19. This configuration provides a generalized support distribution across a user's sacral-pelvic area. Alternatively, to provide a more localized support distribution, the load distribution material can be contoured to a user's sacral pelvic anatomy, as illustrated in FIGS. 17-18 and 20-23. The load distribution material can be shaped so as to distribute a user's load across the ilias, as illustrated in FIGS. 18, 20 and 21. Alternatively, the load distribution material can be shaped so as to distribute a user's load across select areas of the pelvic regions, as illustrated in FIG. 17. As illustrated in FIGS. 23, the load distribution material is not necessarily flat. Rather, the load distribution material can be rounded to correspond with the pelvic anatomy of a user.

Figure 24:
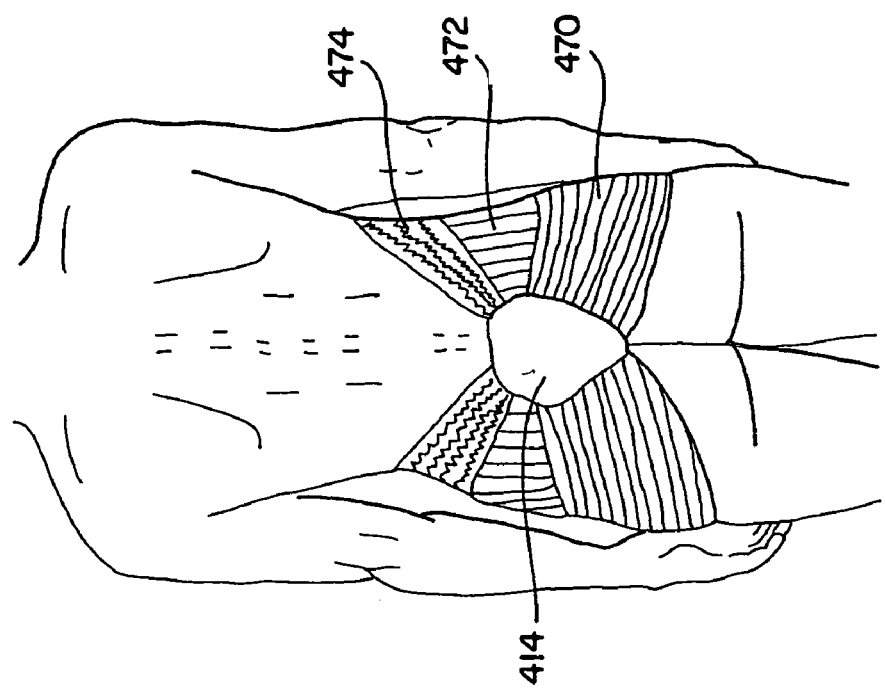
FIG. 24 is a perspective rear view of a fourth embodiment of the present invention with reference to a sacral support member and load distribution materials.

As noted above, conventional support materials may be used to provide proper load distribution and a dynamic surface match between the surfaces of the seatback and the user's anatomy. Such support materials include compressed foams, plastics, strips of lightweight metals such as aluminum, or combinations thereof. FIG. 24 illustrates an embodiment of the present invention in which foam is used to provide multi-dimensional support that targets the sacral-iliac region as well as the adjacent muscles and tissues. For example, as illustrated in FIG. 24, multi-dimensional support can be accomplished by providing a foam having a first density 470 adjacent to a foam having a second density 472. Additional foam having a third density 474 and a fourth density 476 can also be provided. It should be noted that the load distribution material can be incorporated directly into the seatback cover, or placed between the seatback cover and the sacral support member. It should also be noted that the foam density can be altered to properly support different vehicle seating applications. For example, high density foams or firmer load distribution materials can be used for vehicular applications in which a user is subjected to increased gravitational forces, while more complacent foams or load distribution materials can be used for conventional vehicles.

As illustrated in FIG. 14, bow 417 has terminal ends 421, 423, which are slidably mounted to slide wires 429, 431. Slide wires 429, 431 are fixed directly to a lower portion of seatback frame 404. Slide wires 429, 431 are made of a material, preferably steel, that is able to partially withstand a rearward force created by a user reclining against sacral support member 414, but also flex to a limited extent. As a user reclines against sacral support member 414, the user's sacrum creates a backward force on sacral support member 414. This backward force is distributed by bow 417 to slide wires 429, 431. The force causes slide wires 429, 431 to flex. As slide wires 429, 431 flex, sacral support member 414 tilts backward at an angle that substantially coincides with the tilt of a user's sacrum. As a result, sacral support member 414 automatically adjusts to the natural tilt of a user's sacrum, while simultaneously providing an adjustable supporting force.

As illustrated in FIG. 14, terminal ends 421, 423 of bow 417 are bent and form an obtuse angle. When bow 417 is in a disengaged position, the terminal ends abut travel limiters 445, 447. When bow 417 is in a fully engaged position, terminal ends 421, 423 abut travel limiters 449, 451, which limit the flexing of bow 417. Accordingly, travel limiters 449, 451 limit distance that sacral support member 414 can be delivered toward the sacrum of a user. Tension springs 457, 461 are connected to seat frame 404 and maintain bow 417 properly centered relative to the seatback.

As noted above, it has been discovered that delivering the sacral support member a distance of greater than about 3 inches beyond a plane created by a user's back is unnecessary. Accordingly, sacral support element 410 is designed to optimally deliver sacral support member 414 up to 3 inches forward of a plane created by a seated user's back. However, alternate embodiments of the present invention may deliver sacral support member 414 a distance greater than 3 inches beyond the plane created by a user's back. It should also be noted that the overall distance of travel of sacral support member 414 toward the user depends on several factors. For example, the overall distance of travel of sacral support member 14 may change depending on the location of slide wires 429 and 431 within a seat frame, the size of the seat frame, the type of material used to cover the seat, and the thickness of any padding located between the seat cover and sacral support member 414. These elements or combinations thereof additionally affect the distribution of the support load on the sacrum or sacral-pelvic area of a user.

As illustrated in FIG. 14, an actuator cable is provided to move the sacral support member between engaged and disengaged positions. Actuator cable 433 is housed in cable housing 466. One end of cable housing 466 is connected to and passes through terminal end 423. Actuator cable 433 passes through an aperture in terminal end 423 and is fixed to terminal end 421 by clamp 434. Cable housing 466 is connected to terminal end 423 by loose fit connector 455. A conventional motor 457 is used to take up the actuator cable. Alternatively, a conventional manual adjust mechanism can be used to control the actuator cable.

In operation, a user determines the amount of sacral support that is desired and then operates sacral support element 410 to deliver that amount of sacral support. In a disengaged position sacral support member 414 provides minimal or no support to a user's sacrum or sacral area. As desired, a user may adjust the position of sacral support member 414 toward the user's sacral area to provide increased support to that area.

As illustrated in FIGS. 16 and 23, the user may adjust the position of sacral support member 414 to a maximum or fully engaged position that provides maximum support. In the engaged position, sacral support member 414 is approximately between 1.5 inches and 3 inches apart from slide wires 429, 431. To move sacral support member 414 into an engaged position, a user operates the take-up motor 457, which actuates actuator cable 433. This actuation draws together terminal ends 421, 423 of bow 417, thus causing the terminal ends to slide inwardly toward a center portion of slide wires 429, 431. Actuation of actuator cable 433 accordingly urges sacral support member 414 toward a user's sacral area. To disengage sacral support member 414, a user operates the take-up motor to release actuator cable 433. As the actuator cable is released, the bow and the sacral support member return to a disengaged position.

Adjustable sacral support element 410 is also capable of use in cooperation with a lumbar support, which provides additional support for the lumbar region of the spine. As described above in reference to the previously described embodiments of the present invention, sacral support element 410 may be used either independently of or concurrently with lumbar support to provide varying levels of support for both the lumbar and sacral areas of a user. Similarly, adjustable sacral support member 414 may be used cooperatively with a pelvic support.

Referring to the drawings, FIGS. 25-29 illustrate a fifth preferred embodiment of the present invention, and particularly, an adjustable sacral/lumbar support element 510. The fifth preferred embodiment can be configured in at least three different ways. A first configuration, illustrated in FIGS. 25-27, allows a user to synchronously deliver the sacral support member and lumbar support member with a single switch. The second configuration, illustrated in FIG. 28, allows a user to synchronously deliver the sacral support member and the lumbar support member with a first switch, and to fine-tune the sacral support member with a second switch. The third configuration, illustrated in FIG. 29, allows a user to independently control the sacral support member with one switch and the lumbar support member with another switch.

Figure 25:
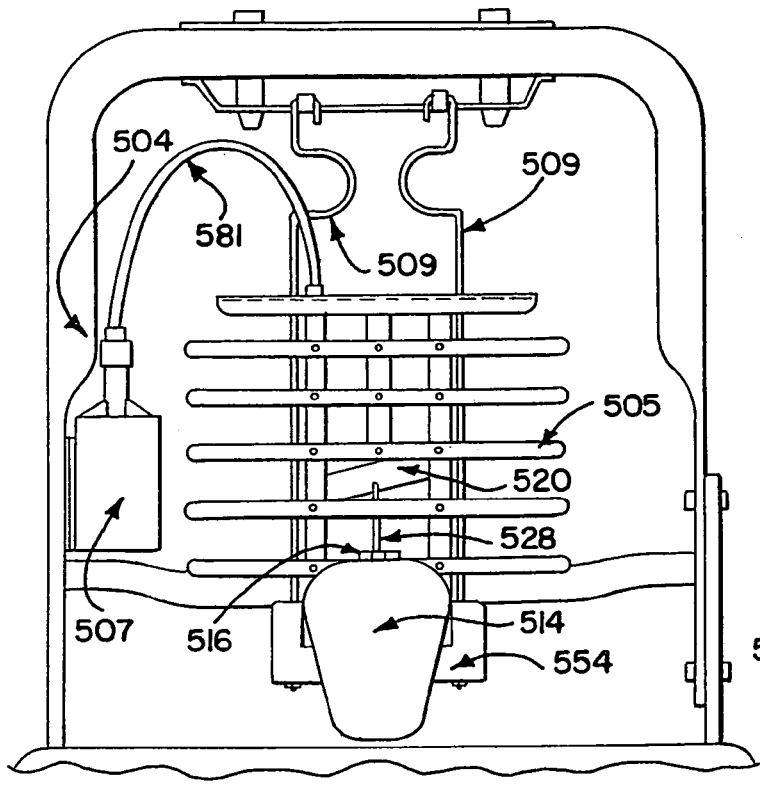
FIG. 25 is a front view of a fifth embodiment of the present invention with reference to a sacral support member, a lumbar support, and a delivery mechanism for the same.

The adjustable sacral/lumbar support element 510 shown in FIG. 25 in general comprises seatback frame 504, sacral support member 514, lumbar support member 505, toggle plate 520, and a load distribution material (not shown). Generally, sacral support member 514 is attached to lumbar support member 505 by hinge 516. A lower portion of lumbar support member 505 as well as the delivery mechanism for sacral support member 514 are attached to seat frame 504. Toggle plate 520 synchronously controls the delivery of both lumbar support member 505 and sacral support member 514. In operation, a user is able, therefore, to deliver both the lumbar support and the sacral support simultaneously by the use of a single switch.

Figure 26:
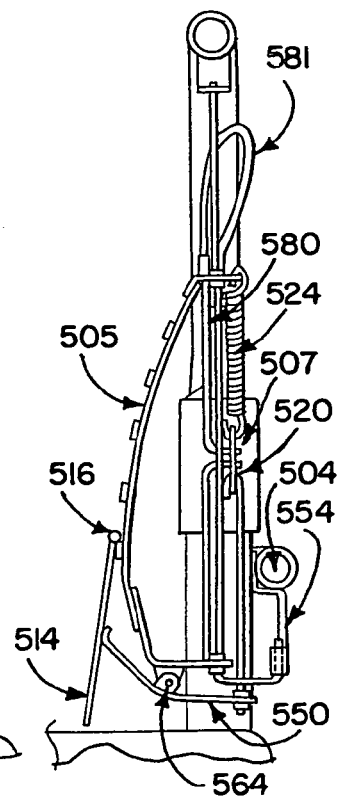
FIG. 26 is a side view of a fifth embodiment of the present invention with reference to a sacral support member and a lumbar support, which are both in an extended position.

As illustrated in FIGS. 25-26, sacral support member 514 supports the sacrum and sacral-pelvic anatomy of a user. As in the previously discussed embodiments, the design of sacral support member 514 generally corresponds to the sacrum of a user. Sacral support member 514 is located within the seatback such that a front surface of sacral support member 514 coincides with the sacral area of a seated person. That is, sacral support member 514 is located at a lower, central portion of seatback frame 504. As best illustrated in FIG. 26, an upper portion of sacral support member 514 is attached by hinge 516 to lumbar support member 505. Hinge 516 is a conventional hinge that is soldered to lumbar support member 505. Sacral support member 514 preferably is formed of a substantially rigid material, such as steel, plastics, or carbon fiber, but materials providing a similar level of support can also be used. Additionally, a load distribution material and cushioning is preferably provided between the user and the sacral support member according to the principles described above regarding the previous embodiments.

Sacral support member 514 is moved into a fully engaged position by a lever arm located behind sacral support member 514. As illustrated in FIG. 26, lever arm 550 is used to drive sacral support member 514 into a fully engaged position. Lever arm 550 preferably is formed as a flat member having a front edge and a rear lip that defines a rear edge. A lubricant or a lubricious surface may be provided on the rear surface of sacral support 514 to facilitate the sliding movement of the lever arm. Lever arm 550 is formed from a rigid material, such as steel, plastic, or carbon fiber. As illustrated in FIG. 26, lever arm 550 is pivotally attached by pin 564 to mounting bracket 554, which is attached to seatback frame 204. Additionally, a return spring is provided about pin 564 so as to return lever arm 550 to a disengaged position.

Lumbar support 505 provides an adjustable support to the lumbar region of a user's anatomy. As illustrated in FIG. 26, a lower portion of lumbar support 505 is fixed to seatback frame 504 by mounting bracket 554. The lower portion of lumbar support 505 can be connected to seatback frame 504 by soldering, for example. An upper portion of lumbar support 505 is slidably connected to guide rods 509. This configuration results in a bowing of the central portion of the lumbar support toward a user when the upper portion of the lumbar support slides downward.

Figure 27:
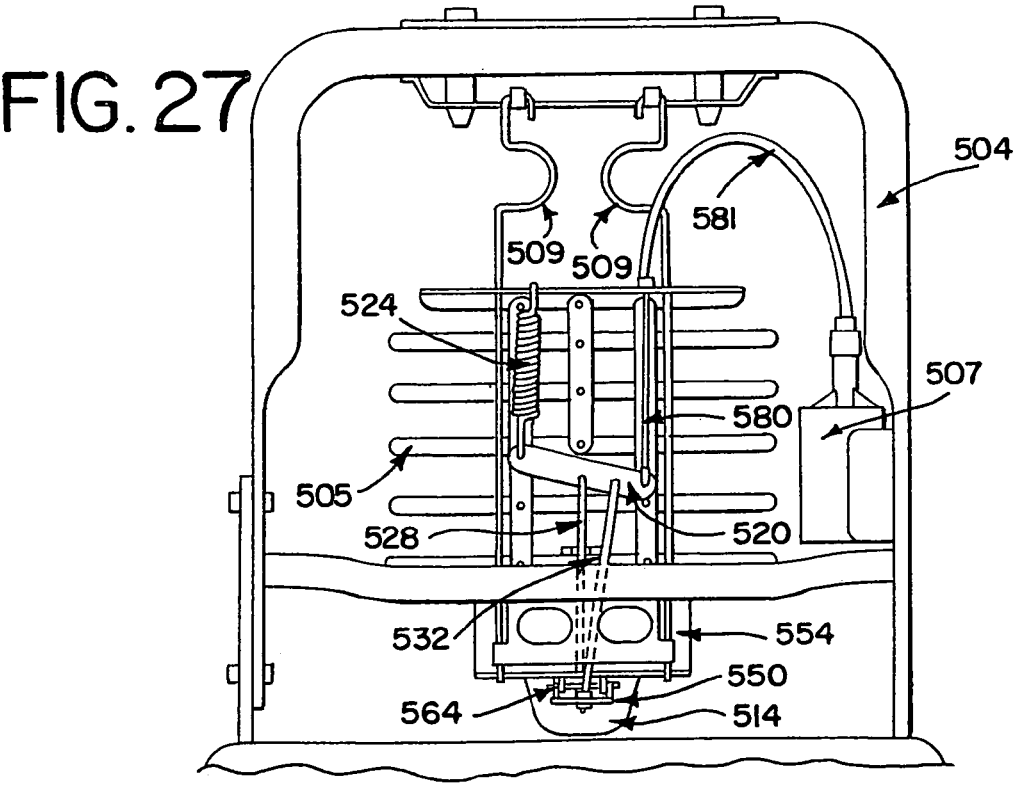
FIG. 27 is a rear view of a fifth embodiment of the present invention with reference to a sacral/lumbar device wherein the position of both a sacral support member and a lumbar device are controlled by a single control unit.

As illustrated in FIG. 27, a first configuration of sacral/lumbar support element 510 allows the synchronous delivery of both the sacral support member and the lumbar support with a single switch. In particular, a single switch activates take-up motor 507, which takes up actuator wire 580. Actuator wire 580 passes through cable housing 581. The cable housing is secured by a loose fit connector to an upper portion of lumbar support 505. In this configuration, a terminal end of actuator wire 580 is connected directly to and controls the movement of toggle plate 520. In turn, toggle plate 520 controls the movement of rod 532 and spring 524. Rod 532 and spring 524 control sacral support member 514 and lumbar support 505, respectively. As best shown in FIG. 27, a first end of rod 532 is connected to toggle plate 520 and a second end of rod 532 is connected to lever 550. Similarly, a first end of spring 524 is connected to toggle plate 520, and a second end of spring 524 is connected to an upper portion of lumbar support 505. In operation, a user is able to control both the sacral support member and the lumbar support member by actuating a single switch that controls the take-up motor. As a result, the sacral support member and the lumbar support can be synchronously delivered by a single switch.

Figure 33:
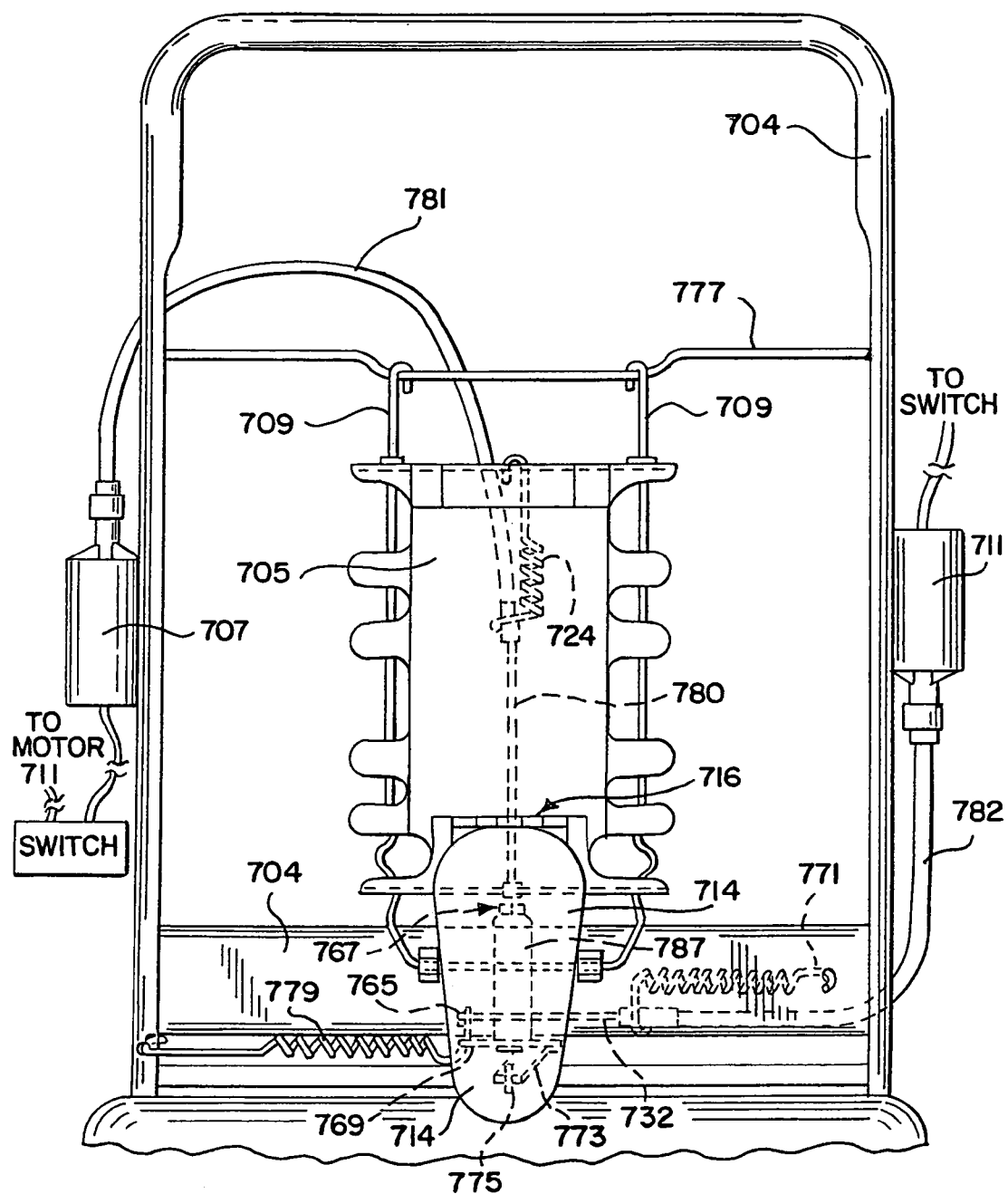
FIG. 33 is a front view of a seventh embodiment of the present invention with reference to a sacral/lumbar device wherein the position of both a sacral support member and a lumbar device are controlled by a single control unit.

FIGS. 33-36 illustrate a variation of the single-switch configuration in which a single switch is operable to synchronously deliver sacral support member 714 with lumbar support member 705. FIG. 33 illustrates sacral support member 714, which is delivered by the action of a bell crank mechanism. The bell crank mechanism generally comprises bell crank 769, strap 773, return spring 779, actuator wire 732, and take-up motor 711. FIG. 33 also illustrates lumbar support member 705. Generally, lumbar support member 705 is delivered by an actuator cable 780 and a take-up motor 707. Both take-up motors 711 and 707 are operable by a single control mechanism or switch.

Figure 34:
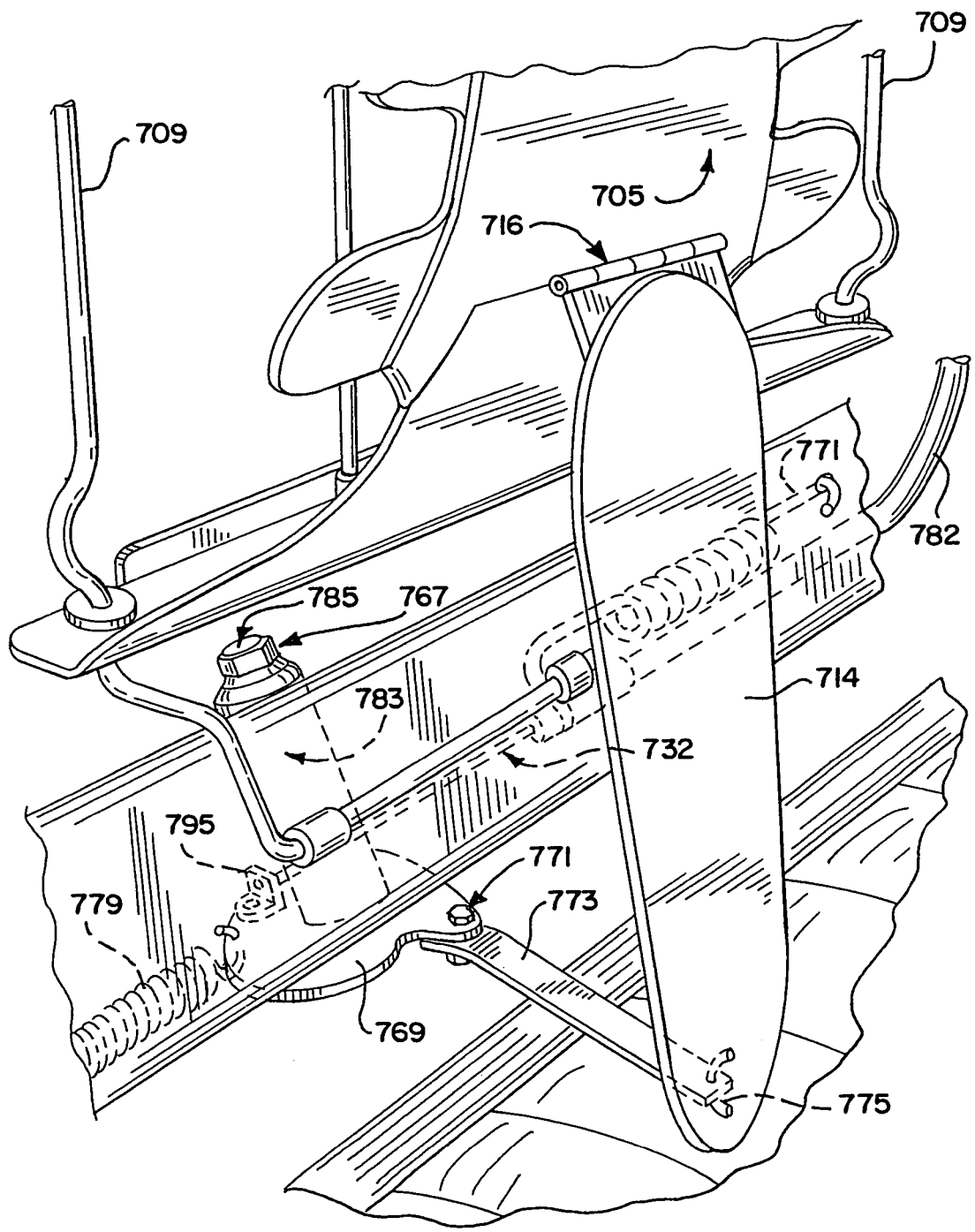
FIG. 34 is a perspective front view of a seventh embodiment of the present invention with reference to a sacral/lumbar device wherein the position of both a sacral support member and a lumbar device are controlled by a single control unit.
Figure 35:
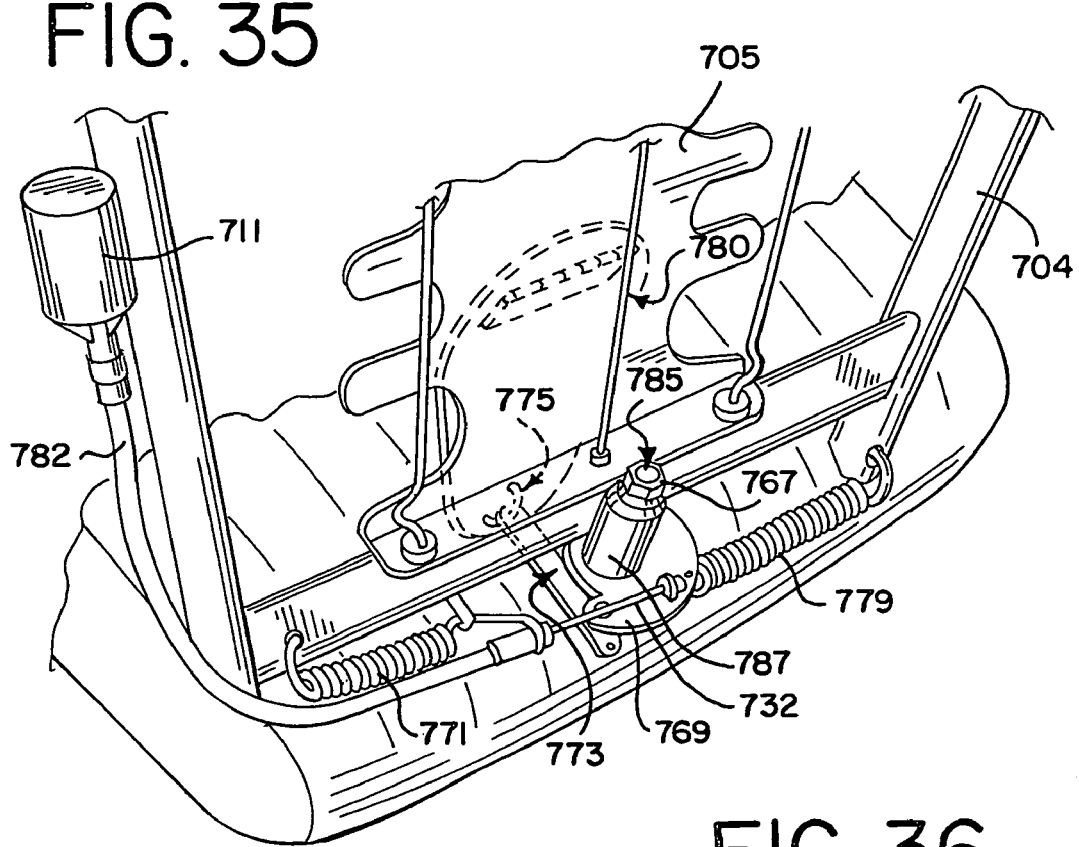
FIG. 35 is a rear perspective view of a seventh embodiment of the present invention with reference to a sacral/lumbar device in a fully disengaged position wherein the position of both a sacral support member and a lumbar device are controlled by a single control unit.

As illustrated in FIG. 34, sacral support member 714 is delivered by a bell crank mechanism. The mechanism includes an elongate, rigid strap 773 having a first end. The first end of strap 773 is pivotally connected to a lower portion of sacral support member 714. As best shown in FIG. 35, the second end of strap 773 is provided with a plurality of holes so as to provide adjustability of the maximum distance and angle at which sacral support member 714 can be delivered. Strap 773 further has a second end that is connected to bell crank 769.

Figure 36:
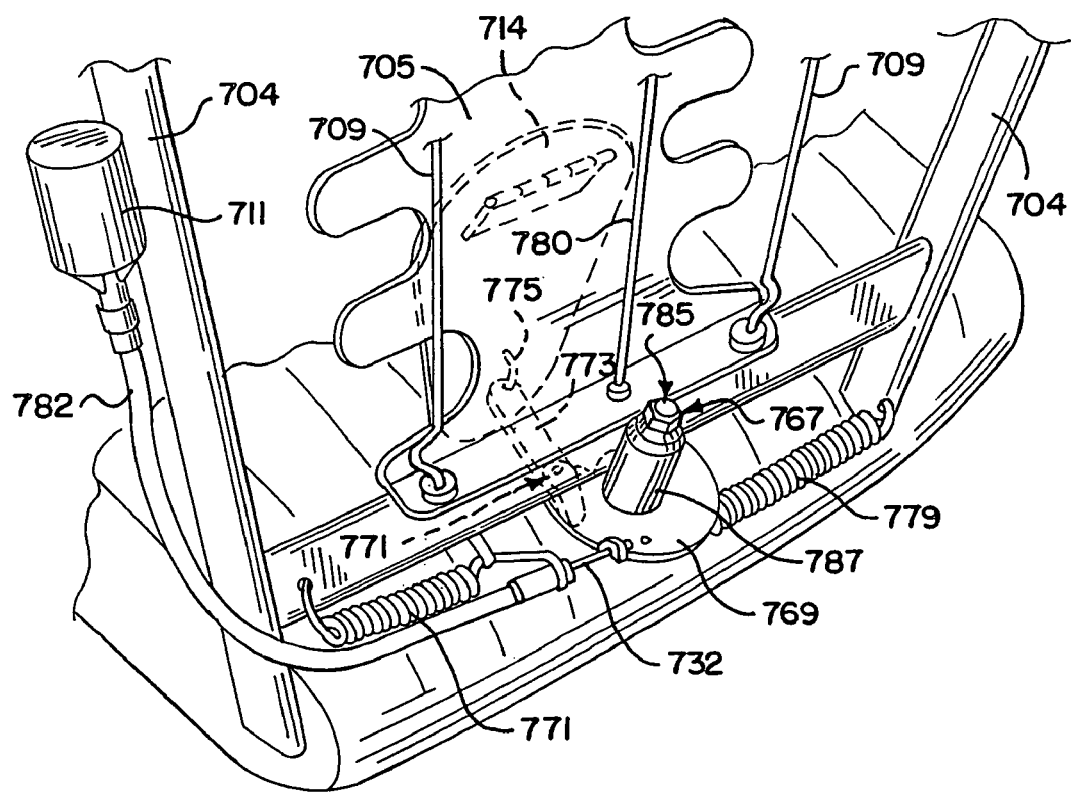
FIG. 36 is a rear perspective view of a seventh embodiment of the present invention with reference to a sacral/lumbar device in a fully engaged position wherein the position of both a sacral support member and a lumbar device are controlled by a single control unit.
Figure 37:
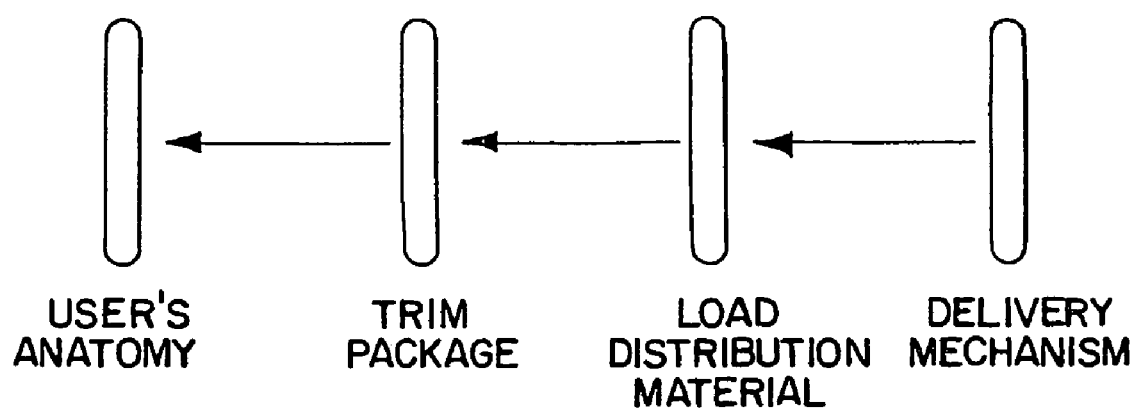
FIG. 37 is a diagram of the present invention with reference to a user's anatomy, a trim package, a load distribution material and a delivery mechanism.

As best illustrated in FIG. 34, bell crank 769 is a roughly semi-circular, relatively flat piece of steel. Pivot pin 785 is fixed, for example by welding, to a central rotation point located on an upper surface of bell crank 769. Pivot pin 785 is disposed within sleeve 783 and secured therewithin by nut 767. Sleeve 783, in turn, is fixed, for example by welding, to seatback frame 704. Consequently, bell crank 769 is able to rotate about a central axis. Bell crank 769 is also provided with a notched portion adapted to receive the second end of strap 773. Additionally, bell crank 769 includes tab 795, to which actuator cable 732 is connected, as best illustrated in FIG. 36. As shown in FIGS. 33, 35, and 36, actuator cable 732 is disposed through cable housing 781, which is secured to frame 704 by spring 771.

Actuator cable 732 is actuated or taken up by motor 711, thus rotating bell crank 769 in a first direction. The rotation of bell crank 769 in the first direction causes the movement of strap 773 toward a user, and ultimately the movement of sacral support member 714 toward a user. FIG. 36 illustrates sacral support member 714 in a fully engaged position, i.e., actuator cable 732 is taken-up by motor 711 and strap 773 is fully extended toward a user.

By contrast, FIG. 35 illustrates sacral support member 714 in a fully retracted position. To return from a fully extended position (FIG. 36) to a fully retracted position (FIG. 35), actuator cable 732 is let out by motor 711. As actuator cable 732 is let out by motor 711, a tension spring or return spring 779 rotates bell crank 769 in a second direction. More specifically, a first end of return spring 779 is connected to bell crank 769 (adjacent tab 795) by a hook or by soldering. A second end of return spring 779 is connected in similar fashion to seatback frame 704. It should be noted that the return force created by return spring 779 can be moderated by altering the point where return spring 779 is connected to bell crank 769. For example, as the connection between the return spring and the bell crank is moved radially inwardly (toward pin 785), to some extent, less return force is created as the sacral support member is extended toward a user. Inversely, as the connection between the return spring and the bell crank is moved radially outwardly (away from pin 785), to some extent, more return force is created as the sacral support member is extended toward a user.

As illustrated in FIGS. 33, lumbar support member 705 is slidably disposed on a pair of rods 709. Upper ends of rods 109 are connected to cross-member 777, and lower ends of rods 109 are connected to cross-member 704. The location and rigidity of rods 109, cross member 777, and cross-member 704 can be altered to control the distance moved by the sacral/lumbar support element 710 when a rearward force is exerted thereon. For example, if rigid rods are used, the sacral/lumbar support element 710 will move a relatively small distance when a rearward force is exerted thereon. Alternatively, if flexible rods are used, sacral/lumbar support element 710 will move a relatively large distance when rearward force is exerted thereon. Therefore, as will be understood by one of ordinary skill, the intended use for a given vehicle will impact the types of rods or cross-members that are selected. For example, relatively flexible rods and cross-members can be used in a wheel chair application, whereas relatively flexible rods and cross members can be used in a sports car application.

Further, as illustrated in FIG. 33, the lumbar support mechanism generally includes lumbar support 705, actuator cable 780, tension spring 724, cable housing 781, and motor 707. A first end of cable housing 781 is connected by spring 724 to a top portion of lumbar support 705. Actuator cable is disposed through the cable housing and is connected at a first end to a bottom portion of lumbar support 705. As a result, motor 707 can be used to take-up actuator cable 780, which causes lumbar support 705 to bow toward a user, thereby providing lumbar support.

As illustrated in FIG. 33, a lower portion of lumbar support 705 is connected by hinge 716 to sacral support member 714. This allows for the synchronous delivery of both lumbar support 705 and sacral support member 714. Additionally, hinge 716 allows a lower portion of sacral support member 714 to extend farther toward a user compared to an upper portion of sacral support member 714. Consequently, sacral support member 714 is delivered at an angle that beneficially coincides with the natural angle of a user's sacral region.

In order to deliver sacral support member 714 and lumbar support member 705 synchronously, motors 707 and 711 are controlled by the same switch or control. The control has a take-up position that causes both motors to simultaneously take up both actuator cables, thereby delivering both supports toward a user's back. Additionally, the control has a let-out position that causes both motors to let out both actuator cables, thereby retracting both supports from a user's back. The control also has a standby position, in which both motors are off. The control is preferably positioned such that a user can easily operate it with one hand. Alternatively, as will be apparent to one of ordinary skill, the present embodiment can be delivered manually, rather than with the use of motors.

As discussed above, the sacral support member automatically adjusts to the natural tilt of a user's sacrum, while simultaneously providing an adjustable supporting force. The sacral support member is also capable of automatically adjusting in a direction oblique to the front of the seatback. For example, the sacral support member automatically adjusts relative to the direction that the user is facing. Such adjustment can also result in improved force distribution upon, for example, a rear impact or collision.

Additionally, the sacral/lumbar element of the present invention can deliver support as the seatback is moved through of a variety of reclined or upright positions. As a result, a user can receive adjustable, sacral/lumbar support even in a partly reclined position. In fact, the sacral/lumbar element can be configured to provide adjustable support throughout a broad range of seatback and seatpan configurations.

As illustrated in FIG. 28, a second configuration of sacral/lumbar support element 510 allows the synchronous delivery of both the sacral support member and the lumbar support with a first switch or control that operates take-up motor 507. In this respect, the device is configured as described regarding the first configuration of the fifth embodiment. However, the second configuration adds the ability to fine-tune the position of sacral support member 514 independent of the lumbar support by operating a second take-up motor 511. This is accomplished by providing a mechanism that overrides the position of toggle plate 520. Specifically, a second motor 511 controls actuator wire 582, which passes through cable housing 583. Cable housing 583 is secured by a loose-fit connector to toggle plate 520. A terminal end of actuator wire 582 is directly connected to lever arm 550. As a result, in operation, a user can deliver both the sacral support member and the lumbar support by activating a first switch that operates the first take-up motor. To further adjust or fine-tune the position of the sacral support member, the user can activate a second switch or control that operates the second take-up motor.

As illustrated in FIG. 29, a third configuration of sacral support element 510 provides fully independent delivery of both the sacral support member and the lumbar support. A first switch only operates the lumbar support and a second switch only operates the sacral support member. In this configuration, cable housing 583 is secured by a loose fit connector to attachment bracket 554, rather than toggle plate 520. This renders separate the actuation of both the sacral support member and the lumbar support. Thus, in operation, a user can specifically and independently select and set the desired amount of sacral support or lumbar support.

Referring to the drawings, FIGS. 30-32 illustrate a sixth embodiment of the present invention, and particularly, an adjustable sacral support element 610. The sixth embodiment generally comprises an inflatable bladder 664 attached to seatback frame 604, a pump 632 for inflating bladder 664, and a sacral support member 614 attached to a front surface of bladder 664. In operation, a user operates a switch that causes the pump to inflate the bladder. The bladder expands as it is inflated. As the bladder expands, it causes the sacral support member to extend towards the user.

As illustrated in FIGS. 30-31, sacral support member 614 supports the sacrum and sacral-pelvic anatomy of a user. As in the previously discussed embodiments, the design of sacral support member 614 generally corresponds to the sacrum of a user. Sacral support member 614 is located within the seatback such that a front surface of sacral support member 614 coincides with the sacral area of a seated person. That is, sacral support member 614 is located at a lower, central portion of seatback frame 604. As best illustrated in FIG. 31, a rear surface portion of sacral support member 614 is attached to bladder 664. Sacral support member 514 preferably is formed of a substantially rigid material, such as steel, plastics, or carbon fiber, but materials providing a similar level of support can also be used. The rear surface of sacral support member 614 can be connected to the bladder by a conventional glue suitable for the particular material used for the sacral support member and the bladder, for example. Additionally, a load distribution material and cushioning is preferably provided between the user and the sacral support member according to the principles described above regarding the previous embodiments.

Sacral support member 614 is moved into a fully engaged position by bladder 664. As illustrated in FIG. 31, bladder 664 is formed of a durable plastic material that is suitable for use as a fluid bladder. Bladder 664 includes a chambered, pillow-shaped portion that is in communication with a chambered, accordion-shaped lower portion of the bladder. As illustrated in FIG. 32, the shape of the bladder can be altered to provide varying levels of support, fit, pelvic control, comfort, and improved posture. In addition, the shape of the bladder can be configured with chambers that provide sacral and sacral/pelvic support and stabilization in posterior, anterior, and lateral directions, as illustrated in FIG. 32. Further, as illustrated in FIG. 32, a chambered bladder can be configured to provide for PSIS nesting.

A rear surface of the bladder is connected to a mounting bracket that is secured to the seatback frame. As illustrated in FIGS. 30-31, bladder 664 further includes an inflation port 665. A standard air hose operatively connects the side inflation port 665 to air pump 632. As illustrated in FIG. 30, a conventional air pump 632 could be implemented with the present invention to inflate or deflate bladder 664. The air pump 632 is operable by a standard switch having an inflate position and a deflate position. In operation, a user controls the level of sacral or sacral/pelvic support by controlling the delivery of air into the bladder. Specifically, the user can add air to the bladder, and thus engage the sacral support member, by moving the switch to the inflate position. Alternatively, the user can remove air from the bladder, and thus disengage the sacral support member, by moving the switch into the deflate position. It should be recognized that the configuration, shape, and operational structure of the bladder can be modified depending, for example, on the type of vehicle in which the sacral support device is used.

Figure 38:
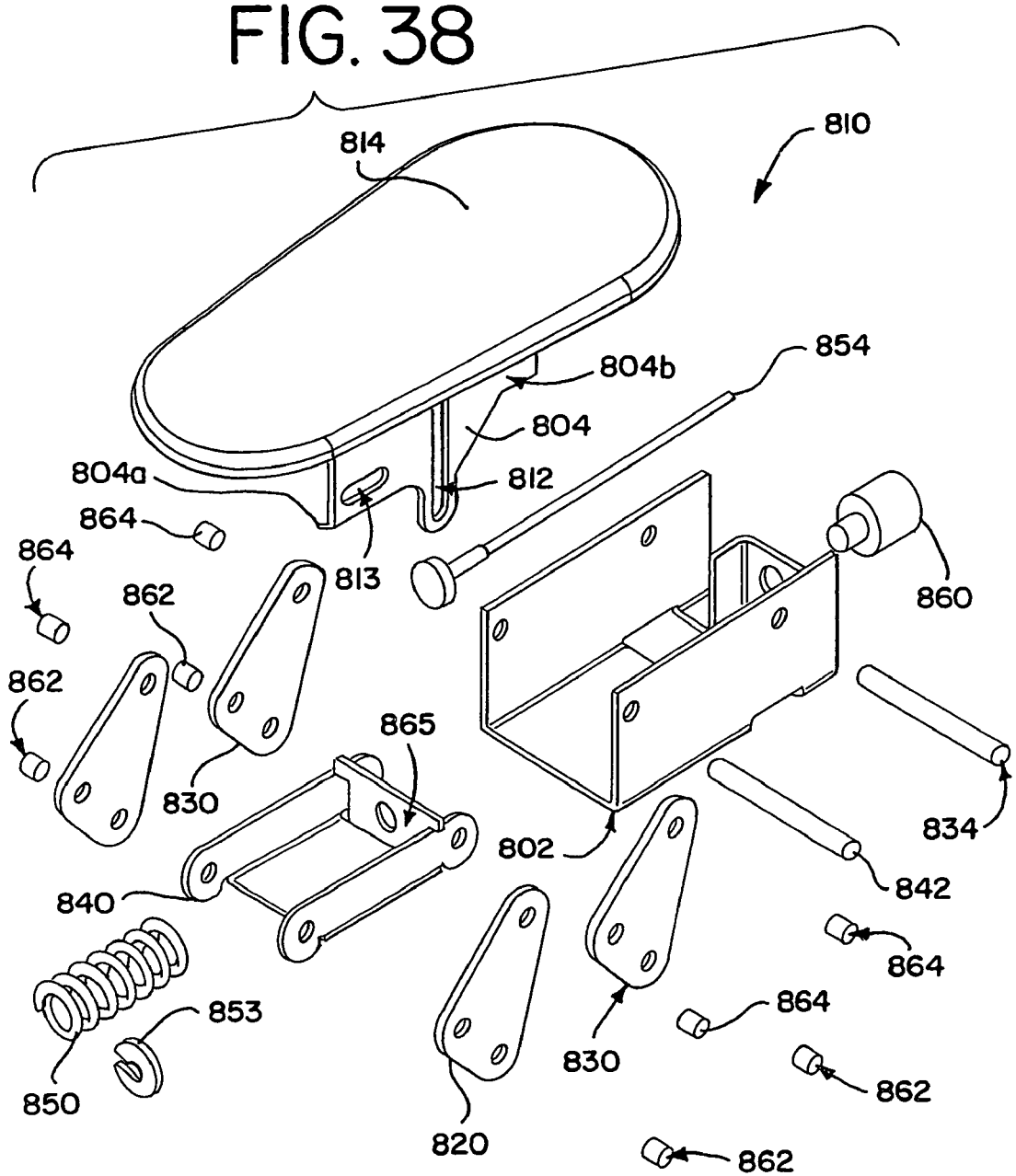
FIG. 38 is an exploded perspective view of an eighth embodiment of the present invention with reference to a sacral device.

Referring to the drawings, FIGS. 38-40 illustrate an eighth preferred embodiment of the present invention, and in particular, an adjustable sacral support element 810. The adjustable sacral support element 810 shown in FIG. 38 in general comprises a sacral support member 814, a sacral support member base 804, levers 820 and 830, parallel bars 840, and a pull cable assembly 854. Generally, the pull cable assembly causes the levers to rotate about pivot pins. As the levers rotate, the sacral support member is urged towards the user's sacral area.

As illustrated in FIG. 38, sacral support member 814 is attached to sacral support member base 804. As discussed above, the top width of sacral support member 814 can vary from 3 times the width of the sacrum of a user at the level of the sacral base of the user to approximately equal to the width of the sacrum of a user at the level of the sacral base of the user. The width of sacral support member 814 decreases progressively from a top portion to a bottom portion of sacral support member 814. The width of the bottom portion is approximately greater than or equal to the width of the sacrum of a user at a level corresponding with the bottom portion. However, as discussed above, the dimensions of the sacral support member 814 may vary depending on a variety of factors.

As best shown in FIG. 39, sacral support member 814 is attached to base member 804. Sacral support member 814 can also be formed integrally with base member 804. Base member 804 is formed from a rigid material, such as steel, plastic, or carbon fiber. Slots 812 and 813 are provided on base member 804. As shown in FIG. 39, slots 812 and 813 form channels or tracks for pivot rod 834 and pins 864, respectively. The pivot rods and pins are press-fit as shown in FIGS. 39 and 40. The slots correlate with the ultimate travel path and orientation in which the sacral support member is delivered. FIGS. 38-40 illustrate an embodiment of the present invention wherein sacral support member 814 travels along a linear path and perpendicular to mounting bracket 802. Changing the shape and dimensions of the slots alters the travel path and orientation of the sacral support member. For example, slot 812 can alternatively be non-linear, e.g., C-shaped or S-shaped, to provide a distinct travel path for sacral support member 814.

As further illustrated in FIGS. 39 and 40, levers 820 and 830 are secured to mounting bracket 802 by rods 842 and 834, respectively. In particular, levers 820 are pivotally mounted within mounting bracket 802. Additionally, parallel bars 840 are positioned between the walls of mounting bracket 802. Parallel bars 840 are used to interconnect levers 820 and 830. In particular, parallel bars 840 cause the synchronous movement of levers 820 and 830, and consequently, the smooth, direct delivery of sacral support member 814.

FIGS. 38-40 additionally illustrate a drive system used to deliver the sacral support member. The illustrative drive system includes a cable assembly, a cable guide, a cross-plate, a compression spring, and a spring cap. Cable assembly 854 is threaded axially through spring 850 and the center hole provided in cross-plate 865. Spring cap 853 secures cable assembly 854 to spring 850, as shown in FIG. 40. As such, when cable assembly 854 is pulled through cable guide 860, pressure builds between spring 850 and cross-plate 865. When the force stored in spring 850 exceeds the outside pressure applied by the seatback, parallel bar 840 begins to move toward cable guide 860.

It should be noted that the cable assembly can be actuated by a motor or manually, as described above with respect to the previously described embodiments. One alternative drive system is a conventional rotary cam drive, which can facilitate manual operation instead of motorized operation of the sacral support element. Other alternative drive systems include worm drives, and chain drives. Indeed, many alternate drive systems that can effect movement of the parallel bars can be used in combination with the embodiment of FIGS. 38-40. Moreover, it should be noted that the sacral support element can be configured to function synchronously or independently of a lumbar support element, as discussed in detail above with respect to previously described embodiments of the present invention.

In operation, a user determines the amount of sacral support that is desired and then operates sacral support element 810 to deliver that amount of sacral support. In a disengaged position sacral support member 814 provides minimal or no support to a user's sacrum or sacral area. As desired, a user may adjust the position of sacral support member 814 toward the user's sacral area to provide increased support to that area. As illustrated in FIG. 39, the user may adjust the position of sacral support member 814 to a maximum or fully engaged position that provides maximum support. To move sacral support member 814 into an engaged position, a user operates a motor, which actuates cable assembly 854. This actuation retracts parallel bars 840, thus causing levers 820 and 830 to rotate counterclockwise around pivot pins 822 and 832, respectively. Base member 804 moves toward mounting bracket 802. Actuation of actuator cable 854 concurrently forces the movement of sacral support member 314 towards a user's sacral area.

As a user reclines against sacral support member 814, the user's sacrum creates a backward force on sacral support member 814. This backward force is distributed to levers 820 and 830. The force causes levers 820 and 830 to rotate clockwise. As levers 820 and 830 to rotate clockwise, sacral support member 314 tilts backward at an angle that substantially coincides with the tilt of a user's sacrum. As a result, sacral support member 314 automatically adjusts to the natural tilt of a user's sacrum, while simultaneously providing an adjustable supporting force. In effect, the adjustable supporting force also provides shock absorption to a user. Notably, the adjustable supporting force can be tailored by changing the size or stiffness of the compression spring, as required by various seating environments.

As noted above, it has been discovered that delivering the sacral support member a distance greater than about 3 inches beyond a plane created by a seated user's back is unnecessary. Accordingly, the sacral support element 810 shown in FIG. 38 is designed to optimally deliver sacral support member 814 up to 3 inches forward of a plane created by a seated user's back. Notwithstanding this, alternate embodiments of the present invention may deliver sacral support member 814 a distance greater than 3 inches beyond the plane created by a user's back. It should also be noted that the overall distance of travel of sacral support member 814 toward the user depends on a variety of factors. For example, the overall distance of travel of sacral support member 814 may change depending on the size of the seat frame, the type of material used to cover the seat, and the thickness of any padding located between the seat cover and sacral support member 814. These elements or combinations thereof additionally affect the distribution of the support load on the sacrum or sacral-pelvic area of a user.

Referring to the drawings, FIGS. 41-43 illustrate a ninth preferred embodiment of the present invention, and in particular, an adjustable sacral support element 910. The adjustable sacral support element 910 shown in FIG. 41 in general comprises a sacral support member 914, a sacral support member base 904, pitch poles 920 and 930, parallel bars 940, and a pull cable assembly 954. Generally, the pull cable assembly causes the levers to rotate about pivot pins. As the levers rotate, the sacral support member is urged towards the user's sacral area.

Sacral support member 914, shown in FIGS. 41-43, is similar in size, shape, and construction to the sacral support members described with respect to previously described embodiments of the claimed invention. Sacral support member 914 is attached to a base member similar to base member 904, shown in FIG. 38. More specifically, rods 964 rotatably secure sacral support member 914 and base member 904. Alternatively, sacral support member 914 and base member 904 can be formed into a unitary, integral piece. Base member 904 is formed from a rigid material, such as steel, plastic, or carbon fiber and is configured to rotatably receive pitch poles 920 and 930.

Pitch poles 920 and 930, are slidably positioned within the walls of mounting bracket 902. In general, the pitch poles are configured so that an end of the pitch poles slides away from the mounting bracket. To achieve this configuration, rods 934 are press-fit into pitch poles 920 and 930, as shown in FIG. 42. In turn, rods 934 are positioned within respective slots 912, as shown in FIG. 42. Additionally, parallel bars 940 interconnect pitch poles 920 and 930. Parallel bars 940 are rotatably secured to pitch poles 920 and 930 by pins 962. As illustrated in FIG. 42, the ends of pins 962 are slidably positioned within respective slots 913. Accordingly, the pitch poles can simultaneously slide and extend synchronously in relation to the mounting bracket. Because rods 934 and pins 962 track slots 913 and 912, respectively, the free ends of the pitch poles extend in a relatively linear path away from the mounting bracket.

FIGS. 41-42 also illustrate a drive system used to deliver the sacral support member. The illustrative drive system includes a cable assembly, a cable guide, a cross-plate, a compression spring, and a spring cap. Cable assembly 954 is threaded axially through spring 950 and the center hole provided in cross-plate 965. Spring cap 953 secures cable assembly 954 to spring 950, as shown in FIG. 42. As such, when cable assembly 954 is pulled through cable guide 960 (shown in FIG. 40), pressure builds between spring 950 and cross-plate 965. When the force stored in spring 950 exceeds the outside pressure applied by the seatback, parallel bars 940 begins to move toward cable guide 960.

It should be noted that the cable assembly can be actuated by a motor or manually, as described above with respect to the previously described embodiments. One alternative drive system is a conventional rotary cam drive, which can facilitate manual operation instead of motorized operation of the sacral support element. Other alternative drive systems include worm drives, and chain drives. Indeed, many alternate drive systems that can effect movement of the parallel bars can be used in combination with the embodiment of FIGS. 41-43. Moreover, it should be noted that the sacral support element can be configured to function synchronously or independently of a lumbar support element, as discussed in detail above with respect to previously described embodiments of the present invention.

In operation, a user determines the amount of sacral support that is desired and then operates sacral support element 910 to deliver that amount of sacral support. In a disengaged position sacral support member 914 provides minimal or no support to a user's sacrum or sacral area. As desired, a user may adjust the position of sacral support member 914 toward the user's sacral area to provide increased support to that area. As illustrated in FIG. 41, the user may adjust the position of sacral support member 914 to a maximum or fully engaged position that provides maximum support. To move sacral support member 914 into an engaged position, a user operates a motor, which takes up cable assembly 954. This retracts parallel bars 940, thereby causing the free end of pitch poles 920 and 930 pitch away from mounting bracket 902.

As a user reclines against sacral support member 914, the user's sacrum creates a backward force on sacral support member 914. This backward force is distributed to pitch poles 920 and 930. The force causes pitch poles 920 and 930 to rotate clockwise. As pitch poles 920 and 930 rotate clockwise, sacral support member 914 tilts backward at an angle that substantially coincides with the tilt of a user's sacrum. As a result, sacral support member 314 automatically adjusts to the natural tilt of a user's sacrum, while simultaneously providing an adjustable supporting force. In effect, the adjustable supporting force also provides shock absorption to a user. Notably, the adjustable supporting force can be tailored by changing the size or stiffness of the compression spring, as required by various seating environments.

As noted above, it has been discovered that delivering the sacral support member a distance greater than about 3 inches beyond a plane created by a seated user's back is unnecessary. Accordingly, the sacral support element 910 shown in FIGS. 42-43 is designed to optimally deliver sacral support member 914 up to 3 inches forward of a plane created by a seated user's back. Notwithstanding this, alternate embodiments of the present invention may deliver sacral support member 914 a distance greater than 3 inches beyond the plane created by a user's back. It should also be noted that the overall distance of travel of sacral support member 914 toward the user depends on a variety of factors. For example, the overall distance of travel of sacral support member 914 may change depending on the size of the seat, the type of material used to cover the seat, and the thickness of any padding located between the seat cover and sacral support member 914. These elements or combinations thereof additionally affect the distribution of the support load on the sacrum or sacral-pelvic area of a user.

Referring to FIG. 36, and as discussed above in great detail, the sacral anatomy of a user can be specifically supported by altering a seat's trim package, the seatback cushion, and/or the sacral support delivery device. Ultimately, specific sacral support results in user comfort, efficiency, strength, muscle control, and endurance.

The embodiments described above and shown herein are illustrative and not restrictive. The scope of the invention is indicated by the claims rather than by the foregoing description and attached drawings of individual embodiments. The invention may be embodied in other specific forms without departing from the spirit of the invention. For example, other adjustment mechanisms may be used with the present invention. In addition, the shape and construction of the load distribution material and associated structures could be varied while still achieving the preferred functionality. For example, a unitary structure may be used instead of a separate cushion, load distribution material, and sacral support member. Additional cushions and load distribution materials may be included between the sacral support member and the user in accordance with the principles discussed above. In another alternative, the cushioning or load distribution materials may have cut-out portions adapted to, for example, receive the sacral support member or the PSIS's of the ilias. In yet another alternative, the load distribution material may partially support or cover the PSIS's of the ilias. In still another embodiment, a load distribution material and/or cushioning could be omitted entirely. In another embodiment, a pair of supports corresponding to the PSIS's of the ilias can be selectively adjusted in a rearward direction, thereby creating a central sacral support area. Accordingly, these and other changes that come within the scope of the claims are intended to be embraced herein.

We claim:

1. A sacral support element, comprising:
   a seat having a seat pan and a seat back with a front portion, a rear portion and an interior frame, the front portion including a support cushion there behind;
   a support member assembly operably connected to the interior frame and positioned at a lower, central portion of the interior frame of the seat back and adjacent a rear portion of the seat pan to coincide with the sacral region of a seated person, the support assembly comprising an adjustable narrow, vertically oriented sacral support member having a vertical dimension that is greater than a horizontal dimension thereof, the sacral support member being pivotally connected to the support assembly and operable to move toward and away from a lower, rear surface of the front portion of the seat back.

2. The sacral support element of claim 1 wherein the sacral support member is made of a rigid material.

3. The sacral support element of claim 1 wherein the sacral support member is dimensioned to support a user's sacrum.

4. The sacral support element of claim 1 wherein the sacral support member is connected to the support assembly by a hinge connection.

5. The sacral support element of claim 1 wherein the top portion has a horizontal width dimension of about 3.25 inches, and the bottom portion has a width dimension of about 2.6 inches.

6. The sacral support element of claim 1 wherein the sacral support member has a vertical tilt between 40 and 85 degrees.

7. The sacral support element of claim 1 wherein the sacral support member travels about 3 inches beyond the front surface of the seatback toward a user's sacrum.

8. The sacral support element of claim 1, further comprising a load distribution material disposed within the seat back against which the sacral support member exerts force.

9. A method of supporting the sacral area of the spine of a seated person, the method comprising the steps of:
   (A) providing a seat comprising:
      a seat having a seat pan and a seat back with a front portion, a rear portion and an interior frame, the front portion including a support cushion therebehind;
      a support assembly operably connected to the interior flame and positioned at a lower, central portion of the interior frame of the seat back and adjacent a rear portion of the seat pan to coincide with the sacral region of a seated person;
      an adjustable sacral support member movably connected to the support assembly and positioned at the bottom of the seat back, the sacral support member being operable to move toward and away from a rear surface of the front portion of the seat back; and (B) moving the adjustable sacral support member incrementally toward and away from the rear surface of the front portion of the seat back by incrementally articulating the adjustable sacral support member between first and second positions thereby moving the front portion of the seat back incrementally toward and away from the sacral area of the spine of the seated user.

10. A sacral support element, comprising:
a seat having a seat pan and a seat back with a front portion, a rear portion and an interior frame, the front portion including a support cushion there behind;
a support assembly operably connected to a lower portion of the interior frame to which a first member is attached;
an adjustable sacral support member attached to the first member and positioned at the bottom of the seat back and positioned at a lower, central portion of the interior frame of the seat back adjacent a rear portion of the seat pan to coincide with the sacral region of a seated person; and
an actuator assembly connected to the interior frame and operationally connected to a first member to incrementally move the sacral support member toward and away from a rear surface of the front portion of the seat back by actuating the first member between a range of positions that in turn moves the adjustable sacral support member between a range of positions.

11. The sacral support element of claim 10 wherein the first member comprise a series of levers pivotally mounted to each of the support member and to the adjustable sacral support member.

12. The sacral support element of claim 11 wherein the actuator assembly includes spring and an actuating cable assembly.

13. The sacral support element of claim 10 wherein the first member comprises at least one pivoting plate that is pivotable between a first non-actuated position and a second actuated position.

14. The sacral support element of claim 13 wherein the pivoting plate pivots relative to the support assembly.

15. The sacral support element of claim 14 further including a load distribution material disposed within the seatback.

16. The sacral support element of claim 13 wherein the adjustable sacral support member is hingedly attached to the support assembly.

17. The sacral support element of claim 16 further including a cam member pivotally attached to the support assembly and the adjustable sacral support member is connected to the cam member by a hinge connection located at the center of the adjustable sacral member whereby plate moves the cam member.

18. The sacral support element of claim 13 wherein the first member comprises two pivoting plates.

19. The sacral support element of claim 18 further including a load distribution material disposed within the seatback.

20. The sacral support element of claim 10 wherein the first member comprises a plate assembly adapted to slide along at least one wire member.

21. The sacral support element of claim 20 wherein the plate assembly comprises two plates each being movably attached to the adjustable sacral support member.

22. The sacral support element of claim 20 wherein the plate assembly comprises a bendable plate.

23. The sacral support element of claim 22 wherein the adjustable sacral support member is directly attached to the bendable plate.

24. The sacral support element of claim 22 further including a load distribution material disposed within the seatback.

25. The sacral support element of claim 20 further including a load distribution material disposed within the seatback.

26. The sacral support element of claim 10 wherein the first member is pivotally attached to the support member and comprises a cam assembly for operating the sacral support member which is pivotally attached to the first member.

27. The sacral support element of claim 10 wherein the first member comprises a flexible member that can be flexed between first and second positions and thereby move the adjustable sacral support member through a range of extended and retracted positions, respectively.

28. The sacral support element of claim 27 wherein the flexing occurs by bending the first member.

29. The sacral support element of claim 28 wherein the first member is bent by moving opposing ends of the first member toward and away from each other.

30. The sacral support element of claim 29 further including at least one load distribution member mounted on the first member that moves along with the adjustable sacral support member.

31. The sacral support element of claim 1 further including a cam assembly for operating the sacral support member.

32. The sacral support element of claim 31 wherein the sacral support member is hinged to a mounting bracket forming part of the support assembly and wherein the cam assembly includes a pivoting lever.

33. The sacral support element of claim 1 further including a cam assembly for operating the sacral support member and load distribution material located between the sacral support member and the seated individual.

34. The sacral support element of claim 1 wherein the sacral support member moves concurrently toward the seated user and slightly upwardly.

35. The sacral support element of claim 1 wherein the sacral support member is moved by a cam member that is attached by a pivoting lever arm.

36. A sacral support seat comprising:
a seat having a seat pan and a seat back with a front portion, a rear portion and an interior frame, the front portion including a support cushion there behind;
an operating assembly operably connected to the interior frame, the operating assembly comprising an actuating member operatively connected to a drive assembly; and
an adjustable sacral support member located at a lower, central portion of the interior frame of the seat back and adjacent a rear portion of the seat pan such that it coincides with the sacral area of a seated person and connected to the drive assembly, the actuating member being controlled so that portions of the actuating member is pivoted about a horizontal or a vertical axis that the sacral support member is operable to move toward and away from a lower central portion of the rear surface of the front portion of the seat back.

37. An adjustable support mechanism incorporated within a seat comprising a sacral support load delivery mechanism, a load distribution member mounted on the occupant side of the delivery mechanism and a trim package mounted over the load distribution member so that the load distribution member adjusts to the contours of the sacrum and sacral-pelvic area of a seated user thereby controlling load distribution across the soft tissues thereof.

38. A sacral support element, comprising:
a seat having a seat back with a front portion, a rear portion and an interior frame, the front portion including a support cushion there behind;
a support assembly operably connected to a lower portion of the interior frame to which a first member is attached;

an adjustable sacral support member attached to the first member and positioned at the bottom of the seat back and positioned at a lower, central portion of the interior frame to coincide with the sacral region of a seated person; and an actuator assembly connected to the interior frame and operationally connected to a first member to incrementally move the sacral support member toward and away from a rear surface of the front portion of the seat back by actuating the first member between a range of positions that in turn moves the adjustable sacral support member between a range of positions wherein the first member comprises a plate assembly adapted to slide along at least one wire member.

39. A sacral support element, comprising:

a seat having a seat pan and a seat back with a front portion, a rear portion and an interior frame, the front portion including a support cushion there behind;

a support assembly operably connected to the interior frame and positioned at a lower, central portion of the interior frame of the seat back and adjacent a rear portion of the seat pan to coincide with the sacral region of a seated person, the support assembly an adjustable narrow, vertically oriented sacral support member having a vertical dimension that is greater than a horizontal dimension thereof, the sacral support member being pivotally connected to the support assembly and operable to move toward and away from a lower, rear surface of the front portion of the seat back and further including a cam assembly for operating the sacral support member.

40. A sacral support element, comprising:

a seat having a seat back with a front portion, a rear portion and an interior frame, the front portion including a support cushion there behind;

a support assembly operably connected to the interior frame and positioned at a lower, central portion of the interior frame to coincide with the sacral region of a seated person, the support assembly an adjustable narrow, vertically oriented sacral support member having a vertical dimension that is greater than a horizontal dimension thereof, the sacral support member being pivotally connected to the support assembly and operable to move toward and away from a lower, rear surface of the front portion of the seat back and further including a cam assembly for operating the sacral support member and load distribution material located between the sacral support member and the seated individual.

41. A sacral support element, comprising:

a seat having a seat back with a front portion, a rear portion and an interior frame, the front portion including a support cushion there behind;

a support assembly operably connected to the interior frame and positioned at a lower, central portion of the interior frame to coincide with the sacral region of a seated person, the support assembly an adjustable narrow, vertically oriented sacral support member having a vertical dimension that is greater than a horizontal dimension thereof, the sacral support member being pivotally connected to the support assembly and operable to move toward and away from a lower, rear surface of the front portion of the seat back and wherein the sacral support member is moved by a cam member that is actuated by a pivoting lever arm.

42. A sacral support element, comprising:

a seat having a seat pan and a seat back with a front portion, a rear portion and an interior frame, the front portion including a support cushion there behind;

a support assembly operably connected to the interior frame and positioned at a lower, central portion of the interior frame of the seat back and adjacent a rear portion of the seat pan to coincide with the sacral region of a seated person, the support assembly an adjustable narrow, vertically oriented sacral support member having a vertical dimension that is greater than a horizontal dimension thereof, the sacral support member being pivotally connected to the support assembly and operable to move toward and away from a lower, rear surface of the front portion of the seat back and wherein the first member comprises a flexible member that can be flexed between first and second positions and thereby move the adjustable sacral support member through a range of extended and retracted positions, respectively with the flexing occuring by bending the first member.

43. A sacral support element, comprising:

a seat having a seat pan and a seat back with a front portion, a rear portion and an interior frame, the front portion including a support cushion there behind;

a support assembly operably connected to a lower portion of the interior frame to Which a first member is attached;

an adjustable sacral support member attached to the first member and positioned at the bottom of the seat back and positioned at a lower, central portion of the interior frame of the seat back adjacent a rear portion of the seat pan to coincide with the sacral region of a seated person; and an actuator assembly connected to the interior frame and operationally connected to a first member to incrementally move the sacral support member toward and away from a rear surface of the front portion of the seat back by actuating the first member between a range of positions that in turn moves the adjustable sacral support member between a range of positions and wherein the first member comprise a series of levers pivotally mounted to each of the support member and to the adjustable sacral support member.

* * * * *